US012772166B2

(12) United States Patent
Song et al.

(10) Patent No.: US 12,772,166 B2
(45) Date of Patent: Oct. 20, 2026

(54) METHOD AND APPARATUS FOR SAVING POWER CONSUMPTION OF BASE STATION IN COMMUNICATION SYSTEM

(71) Applicant: ELECTRONICS AND TELECOMMUNICATIONS RESEARCH INSTITUTE, Daejeon (KR)

(72) Inventors: Jae Su Song, Daejeon (KR); Hee Sang Chung, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 343 days.

(21) Appl. No.: 18/490,333

(22) Filed: Oct. 19, 2023

(65) Prior Publication Data

US 2024/0137862 A1 Apr. 25, 2024
US 2024/0236846 A9 Jul. 11, 2024

(30) Foreign Application Priority Data

Oct. 24, 2022 (KR) ........................ 10-2022-0137526
Jun. 26, 2023 (KR) ........................ 10-2023-0081947

(51) Int. Cl.
*H04W 52/02* (2009.01)
*H04W 36/16* (2009.01)

(52) U.S. Cl.
CPC ..... *H04W 52/0206* (2013.01); *H04W 36/165* (2013.01)

(58) Field of Classification Search
CPC ........... H04W 52/0206; H04W 36/165; H04W 36/08; H04W 16/32; H04W 36/04; H04W 68/02; H04W 76/28; H04W 88/08; Y02D 30/70
See application file for complete search history.

(56) References Cited

U.S. PATENT DOCUMENTS

| | | | | |
|---|---|---|---|---|
| 8,103,306 | B2 | 1/2012 | Iwamura et al. | |
| 8,320,965 | B2 | 11/2012 | Kwun et al. | |
| 9,008,717 | B2 | 4/2015 | Yu et al. | |
| 9,049,671 | B2 | 6/2015 | Yamazaki | |
| 9,398,528 | B2 | 7/2016 | Zhong et al. | |
| 9,681,347 | B2 | 6/2017 | Choi et al. | |
| 12,231,284 | B2 * | 2/2025 | Parkvall | H04J 11/0059 |
| 2015/0181493 | A1 | 6/2015 | Park et al. | |
| 2018/0279403 | A1 | 9/2018 | Kim | |
| 2022/0141638 | A1 | 5/2022 | Kim et al. | |

(Continued)

FOREIGN PATENT DOCUMENTS

KR 10-2441024 B1 9/2022

*Primary Examiner* — Brian T O Connor
(74) *Attorney, Agent, or Firm* — Rabin & Berdo, P.C.

(57) ABSTRACT

A method of a first base station may comprise: determining, by a MT of the first base station, whether there is a terminal connected to a BSU of the first base station, when a power-off condition is satisfied in the BSU; instructing, by the MT, the terminal, which is connected to the BSU, to be handed over to a second base station, when there is a terminal connected to the BSU; instructing, by the MT, the BSU to power off the BSU, when the handover of the terminal, which is connected to the BSU, is completed; and transmitting, by the MT, a first message, which indicates a power-off state of the first base station, to the second base station, when the BSU is powered off.

18 Claims, 16 Drawing Sheets

(56) References Cited

U.S. PATENT DOCUMENTS

| | | | | |
|---|---|---|---|---|
| 2022/0322418 | A1 | 10/2022 | Kim et al. | |
| 2023/0088698 | A1* | 3/2023 | Babaei | H04W 72/23 370/328 |
| 2023/0389120 | A1* | 11/2023 | Babaei | H04W 52/0235 |
| 2024/0098636 | A1* | 3/2024 | Babaei | H04W 52/0212 |
| 2025/0008599 | A1* | 1/2025 | Babaei | H04W 72/23 |

* cited by examiner

100

METHOD AND APPARATUS FOR SAVING POWER CONSUMPTION OF BASE STATION IN COMMUNICATION SYSTEM

CROSS-REFERENCE TO RELATED APPLICATIONS

This application claims priority to Korean Patent Applications No. 10-2022-0137526, filed on Oct. 24, 2022, and No. 10-2023-0081947, filed on Jun. 26, 2023, with the Korean Intellectual Property Office (KIPO), the entire contents of which are hereby incorporated by reference.

BACKGROUND

1. Technical Field

Exemplary embodiments of the present disclosure relate to an energy saving technique, and more specifically, to a technique for reducing power consumption of a base station in a communication system.

2. Related Art

As communication technology evolves recently, power consumption in a network is continuously increasing. In order to meet rapidly increasing data traffic demands, a communication system consumes quite a lot of energy, increases the operating expenditure (OPEX), and increases greenhouse gas emissions. As such, due to economic and environmental reasons, network energy saving (NES) has become an important consideration.

Recent studies have shown that the cost of energy consumption reaches 23% of the total cost paid by mobile telecommunication companies. Specifically, speaking of energy consumption proportion by sub-systems constituting a mobile communication system, more than 70% of the total energy consumption of the communication system is consumed in the radio access network (RAN).

SUMMARY

Exemplary embodiments of the present disclosure are directed to providing a method and an apparatus for reducing the power consumption of a base station in an environment where a macro cell base station and a small cell base station are overlayed in a communication system.

According to a first exemplary embodiment of the present disclosure, a method of a first base station may comprise: determining, by a mobile terminal (MT) of the first base station, whether there is a terminal connected to a base station unit (BSU) of the first base station, when a power-off condition is satisfied in the BSU; instructing, by the MT, the terminal, which is connected to the BSU, to be handed over to a second base station, when there is a terminal connected to the BSU; instructing, by the MT, the BSU to power off the BSU, when the handover of the terminal, which is connected to the BSU, is completed; and transmitting, by the MT, a first message, which indicates a power-off state of the first base station, to the second base station, when the BSU is powered off. Here, a full coverage of the first base station partly may overlap with a coverage of the second base station. The BSU may use a first frequency, and the second base station may use a second frequency.

Messages delivered between the MT and the second base station may be delivered through a control link using the second frequency resource, a connection of the control link to a core network may be blocked, and the control link may be connected to the second base station.

The control link may be established by an access stratum (AS) layer.

The method may further comprise temporarily suspending, by the MT, the connection of the control link, based on a second message indicating a base station power state report confirmation received from the second base station.

A RRC connection of the MT with the second base station may be in RRC_INACTIVE state.

The power off condition may be satisfied when a sum of data transmission rates of terminals connected to the BSU is equal to or smaller than a threshold.

The method may further comprise instructing, by the MT, the BS to immediately power off the BSU, when the power off condition is satisfied, and there is no terminal connected to the BS.

The method may further comprise: receiving discontinuous reception (DRX) setting information and paging setting information from the second base station; monitoring, by the MT, a paging initiated from the second base station, based on the received DRX setting information and paging setting information; and performing, by the MT, a base station power on procedure of turning on a power of the BSU, when a paging message is received from the second base station.

According to a second exemplary embodiment of the present disclosure, a method of a first base station may comprise: determining whether there is a second base station in a power-off state, which belongs to a first area in a cell coverage of the first base station which is set by a plurality of areas, when a user equipment (UE) activity in the first area exceeds a threshold; transmitting a first message, which indicates a power-on of the second base station, to the second base station, when there is the second base station; receiving a second message, which indicates that the second base station is in a power-on state, from the second base station; and initiating a handover procedure to allow a terminal, which is located in the first area and is connected to the first base station, to be handed over to the second base station. Herein, the first base station may use a first frequency, and the second base station may use a second frequency.

Messages delivered between the first base station and the second base station may be delivered through a control link using the first frequency resource, a connection of the control link to a core network may be blocked, and the control link may be connected to the second base station.

The control link may be established by an access stratum (AS) layer.

The receiving of the second message may further include transmitting a third message, which indicates temporary suspension of the connection of the control link, to the second base station.

The UE activity may be a sum of data transmission rates of terminals which are located in the first area and are connected to the base station.

The first message may be a paging message.

According to a third exemplary embodiment of the present disclosure, a first base station may comprise a processor. Herein, the processor may cause the first base station to: determine whether there is a second base station in a power-off state, which belongs to a first area in a cell coverage of the first base station which is set by a plurality of areas, when a user equipment (UE) activity in the first area exceeds a threshold; transmit a first message, which indicates a power-on of the second base station, to the second base station, when there is the second base station;

receive a second message, which indicates that the second base station is in a power-on state, from the second base station; and initiate a handover procedure to allow a terminal, which is located in the first area and is connected to the first base station, to be handed over to the second base station. Herein, the first base station may use a first frequency, and the second base station may use a second frequency.

Messages delivered between the first base station and the second base station may be delivered through a control link using the first frequency resource, a connection of the control link to a core network may be blocked, and the control link may be connected to the second base station.

The control link may be established by an access stratum (AS) layer.

The receiving of the second message may further cause the first base station to transmit a third message, which indicates temporary suspension of the connection of the control link, to the second base station.

The UE activity may be a sum of data transmission rates of terminals which are located in the first area and are connected to the base station.

The first message may be a paging message.

According to exemplary embodiments of the present disclosure, in an environment where macro cells and small cells are overlayed, small cell base stations can dynamically perform power-on/off, and power consumption of small cell base stations can be reduced. Thus, the energy saving of the communication system may be improved.

DETAILED DESCRIPTION OF THE EMBODIMENTS

Figure 1:
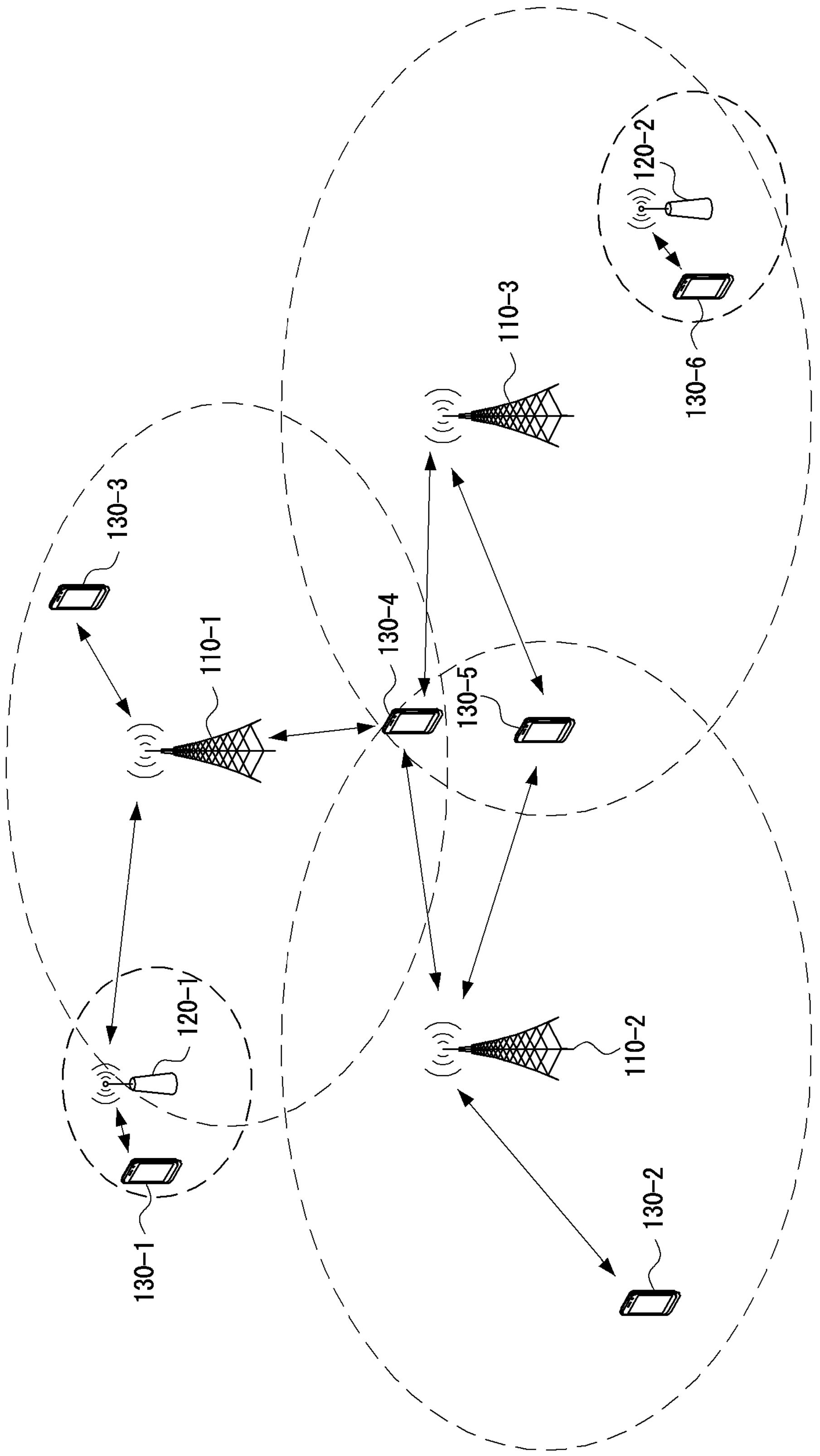
FIG. 1 is a conceptual diagram illustrating an exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term “and/or” includes any and all combinations of one or more of the associated listed items.

In exemplary embodiments of the present disclosure, “at least one of A and B” may mean “at least one of A or B” or “at least one of combinations of one or more of A and B”. Also, in exemplary embodiments of the present disclosure, “one or more of A and B” may mean “one or more of A or B” or “one or more of combinations of one or more of A and B”.

In exemplary embodiments of the present disclosure, “(re)transmission” may mean “transmission”, “retransmission”, or “transmission and retransmission”, “(re)configuration” may mean “configuration”, “reconfiguration”, or “configuration and reconfiguration”, “(re)connection” may mean “connection”, “reconnection”, or “connection and reconnection”, and “(re)access” may mean “access”, “re-access”, or “access and re-access”.

In the present disclosure, a time may refer to a ‘time point’, and a time point may mean a time. A transmission time may mean a transmission start time or a transmission end time, and a reception time may mean a reception start time or a reception end time.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)).

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
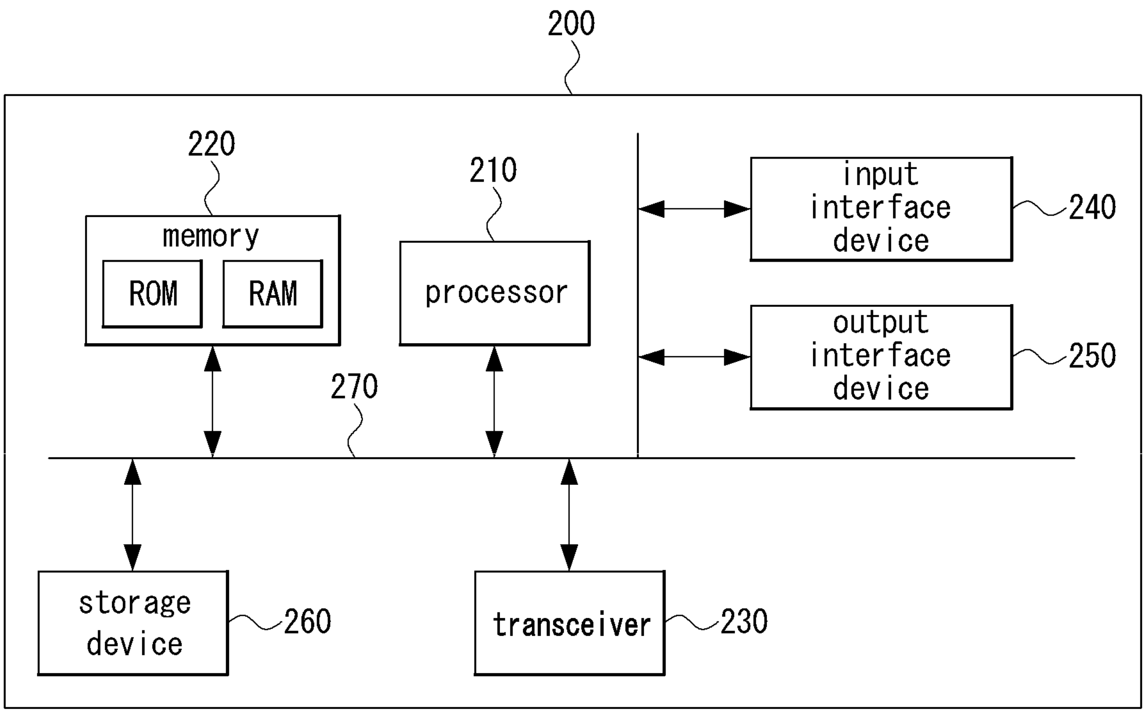
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. The second terminal 130-2, the fourth terminal 130-4, and the fifth terminal 130-5 may belong to cell coverage of the second base station 110-2. The fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Figure 3:
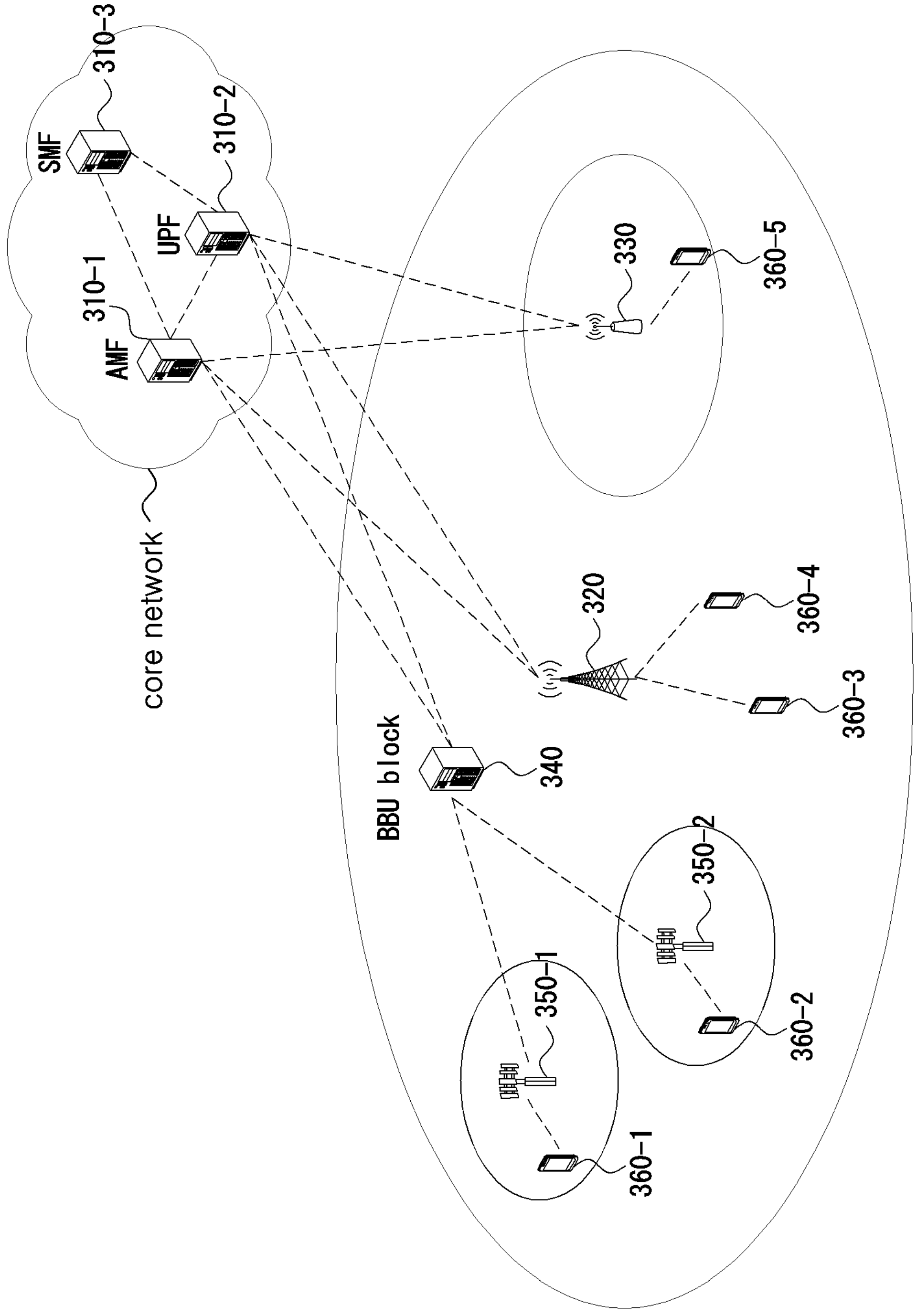
FIG. 3 is a conceptual diagram illustrating a second exemplary embodiment of the communication system.

FIG. 3 is a conceptual diagram illustrating a second exemplary embodiment of the communication system.

Referring to FIG. 3, in a communication system, a core network may include AMF 310-1, UPF 310-2, SMF 310-3, etc., and a base station 320 (or a macro cell base station) or a small cell base station 330 may be connected to a core network and a wired backhaul. Further, when the function of the base station is separately configured by a baseband processing function block 340 (e.g., a baseband unit (BBU) or a cloud platform), and a remote wireless transmission and reception node (350-1, 350-2) (e.g., a remote radio head (RRH) or a transmission & reception point (TRP)), connection may be made through a wired front hall.

The functions of the baseband processing function block 340 may be located in a base station which supports a plurality of remote wireless transmission and reception nodes 350-1 and 350-2, or may be configured as logical functions in the middle area between the base station and AMF/UPF/SMF (or MME/P-GW/S-GW) 310-1, 310-2 and 310-3). In this case, the functions of the baseband processing function block 340 may be configured in a manner that is physically independent from the base station and AMF/UPF/SMF, or may be installed at the base station (or AMF/UPF/SMF) to be operated.

Each of the remote wireless transmission and reception nodes 350-1 and 350-2 of FIG. 3 and base stations 110-1, 110-2, 110-3, 120-1, 120-2, 320, and 330 of FIGS. 1 and 3 may support downlink (DL) transmission and uplink (UL) transmission based on OFDM, OFDMA, SC-FDMA, or NOMA. In addition, in the case that the remote wireless transmission and reception nodes 350-1 and 350-2 of FIG. 3 and base stations 110-1, 110-2, 110-3, 120-1, 120-2, 320, and 330 of FIGS. 1 and 3 support a beamforming function using an antenna array by applying a transmission carrier of a millimeter wave (mmWave) band, each thereof may provide services without interference between the beams in the base station through the formed beam, and may provide services for a plurality of terminals (or UEs) in one beam.

In addition, each of the plurality of base stations 110-1, 110-2, 110-3, 120-1, 120-2, 320, and 330 may support multiple-input multiple-output (MIMO) transmission (e.g., single user (SU)-MIMO, multi user (MU)-MIMO, and massive MIMO), coordinated multipoint (CoMP) transmission, carrier aggregation (CA) transmission, transmission at an unlicensed band, device to device communication (D2D) (or proximity services (ProSe)), etc. Here, each of the plurality of terminals 130-1, 130-2, 130-3, 130-4, 130-5, 130-6, 360-3, 360-4, and 360-5 may perform operations corresponding to base stations 110-1, 110-2, 110-3, 120-1, 120-2, 320, and 330 and operations supported by base stations 110-1, 110-2, 110-3, 120-1, 120-2, 320, and 330. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminal 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus each of the fourth terminal 130-4 and the fifth terminal 130-5 may perform the D2D communications under control of each of the second base station 110-2 and the third base station 110-3.

On the other hand, in order to perform mobility support and wireless resource management functions, the base station may transmit a synchronization signal (e.g., a synchronization signal/physical broadcast channel (SS/PBCH) block and/or a reference signal. In order to support multiple numerology, a frame format that supports symbols with different lengths may be set. In this case, the terminal may perform a monitoring operation of synchronization signals and/or reference signals in a frame according to a default symbol length, an initial numerology, or a default numerology. Each of the initial numerology and the default numerology may be applied to a frame format applied to wireless resources where a UE-common search space has been set, a frame format applied to wireless resources where a control resource set (CORESET) #0 of the NR communication system has been set, and/or a frame format applied to wireless resources where a synchronization symbol burst capable of identifying cells in the NR communication system is transmitted.

The frame format may mean a subcarrier spacing, a control channel (e.g., CORESET), a symbol, a slot, and/or information of setting parameters for a reference signal (e.g., a setting parameter value, an offset, an index, an identifier, a range, a period, an interval, and duration) in a radio frame (or a subframe). The base station may use system information and/or a control message (e.g., a dedicated control message) to inform the terminal of the frame format.

The terminal connected to the base station may transmit a reference signal (e.g., a reference signal exclusively for uplink) to the base station using the resources set by the base station. For example, a reference signal exclusively for uplink may include a sounding reference signal (SRS). Also, the terminal connected to the base station may receive a reference signal (e.g., a reference signal exclusively for downlink) from the base station in the resources set by the base station. The reference signal exclusively for downlink may be channel state information-reference signal (CSI-RS), phase tracking-reference signal (PT-RS), demodulation-reference signal (DM-RS), etc. Each of the base station and the terminal may perform beam management operations through monitoring for configured beams or active beams based on reference signals.

For example, the first base station 110-1 may transmit a synchronization signal and/or a reference signal so that the first terminal 130, which is located in a communication service area, may search itself and perform a synchronization maintenance operation, a beam setting operation, or a link monitoring operation of downlink. The first terminal 130-1 connected to the first base station 110-1 (e.g., a serving base station) may receive wireless resource setting information of a physical layer for connection setting and wireless resource management, from the first base station 110-1. The wireless resource setting information of the physical layer may be setting parameters included in the RRC control message in the LTE communication system and/or NR communication system. For example, the wireless resource setting information may include PhysicalConfigDedicated, PhysicalCellGroupConfig, PDCCH-Config (Common), PDSCH-Config(Common), PDCCH-ConfigSIB1, ConfigCommon, PUCCH-Config(Common), PUSCH-Config(Common), BWP-DownlinkCommon, BWPUplinkCommon, ControlResourceSet, RACH-ConfigCommon, RACH-ConfigDedicated, RadioResourceConfigCommon, RadioResourceConfigDedicated, ServingCellConfig, ServingCellConfigCommon, etc.

The wireless resource setting information may include parameter values such as a setting cycle (or allocation cycle) of a signal (or wireless resource) according to the frame format of a base station, time resource allocation information for transmission, frequency resource allocation information for transmission, and transmission time (or allocation time). In order to support the multiple numerology, the frame format of a base station (or transmission frequency) may mean a frame format having different symbol lengths according to a plurality of subcarrier spacings in one wireless frame. For example, the number of symbols that make up a mini slot, a slot, and a subframe, respectively, may be different within one wireless frame (e.g., a frame having a 10 ms length).

- transmission frequency of a base station and setting information of a frame format
- setting information of a downlink reference signal (e.g., CSI-RS, common RS, etc.);
- setting information of a uplink control signal;
- setting information of a downlink control channel (e.g., physical downlink control channel (PDCCH))
- setting information of a uplink control channel (e.g., physical uplink control channel (PUCCH))
- setting information of a scheduling request signal;
- setting information of feedback (e.g., acknowledgement (ACK) or negative ACK (NACK)) transmission resources in hybrid automatic repeat request (HARQ) procedure;
- The number of antenna ports, information on an antenna array, beamforming configuration and/or beam index mapping information for beamforming application;
- setting information of downlink signals and/or upward link signals (or uplink access channel resources) for beam sweeping (or beam monitoring);
- setting information of a beam setting operation, a beam recovery operation, a beam reconfiguration operation, a wireless link re-establishment operation, a beam change operation in the same base station, a reception signal of a beam, which triggers a handover procedure to another base station, and a control timer of the above-described operations.

In a wireless frame format which supports different symbol lengths in order to support a multiple numerology, the setting cycle (or allocation cycle) of parameters constituting the above-described information, time resource allocation information, frequency resource allocation information, transmission time, and/or allocation time may be information which is set according to their corresponding symbol length (or subcarrier spacing).

Next, prior to the description of the present disclosure, the necessity of the present disclosure and the current status of 3GPP standards will be described.

Network Energy Saving (NES)

As communication technology evolves recently, power consumption in a network is continuously increasing. In order to meet rapidly increasing data traffic demands, a communication system consumes quite a lot of energy, increases the operating expenditure (OPEX), and increases greenhouse gas emissions. As such, due to economic and environmental reasons, network energy saving (NES) has become an important consideration.

Recent studies have shown that the cost of energy consumption reaches 23% of the total cost paid by mobile telecommunication companies. Specifically, the energy consumption proportion may be distinguished as follows by sub-systems constituting a mobile communication system.

Figure 4:
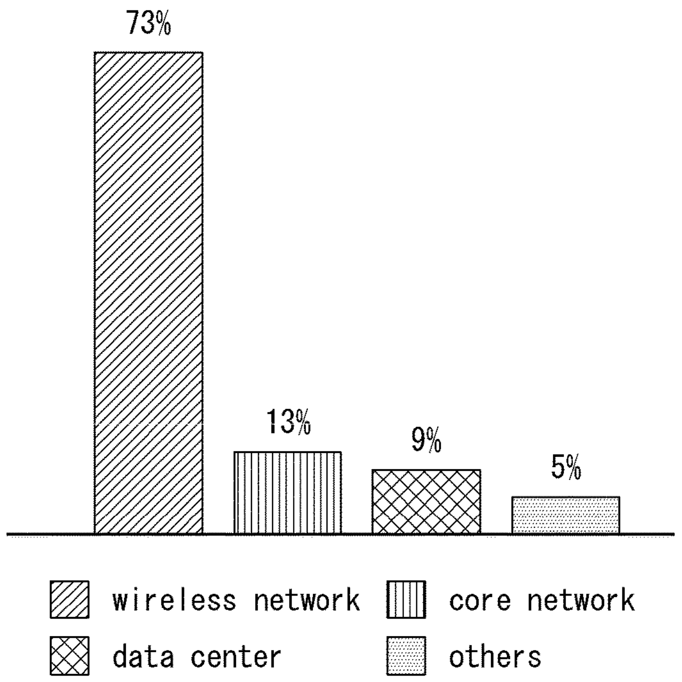
FIG. 4 is a diagram illustrating an exemplary embodiment to describe the energy consumption proportion of each subsystem in a communication system.

FIG. 4 is a diagram illustrating an exemplary embodiment to describe the energy consumption proportion of each subsystem in a communication system.

Referring to FIG. 4, more than 70% of the total energy consumption of the communication system is consumed in the radio access network (RAN).

In particular, power consumption in the RAN may increase for various reasons. For example, the power consumption may increase as the communication system supports wider bandwidth to support the data speed required by various services and applications, and the frequency band used increases. In order to support broadband, devices such as an analog to digital converter (ADC) should operate at a high speed, resulting in an increase in power consumption. In addition, when using high frequency bands such as millimeter and terahertz wave (THz), the radio wave attenuation is severe, so beamforming technique including a multi-antenna is essential to overcome the attenuation. In addition, since the base station coverage is reduced, more base stations need to be installed to provide services for the same area. For these reasons, the power consumption of base stations is relatively more increasing in the communication system.

Figure 5:
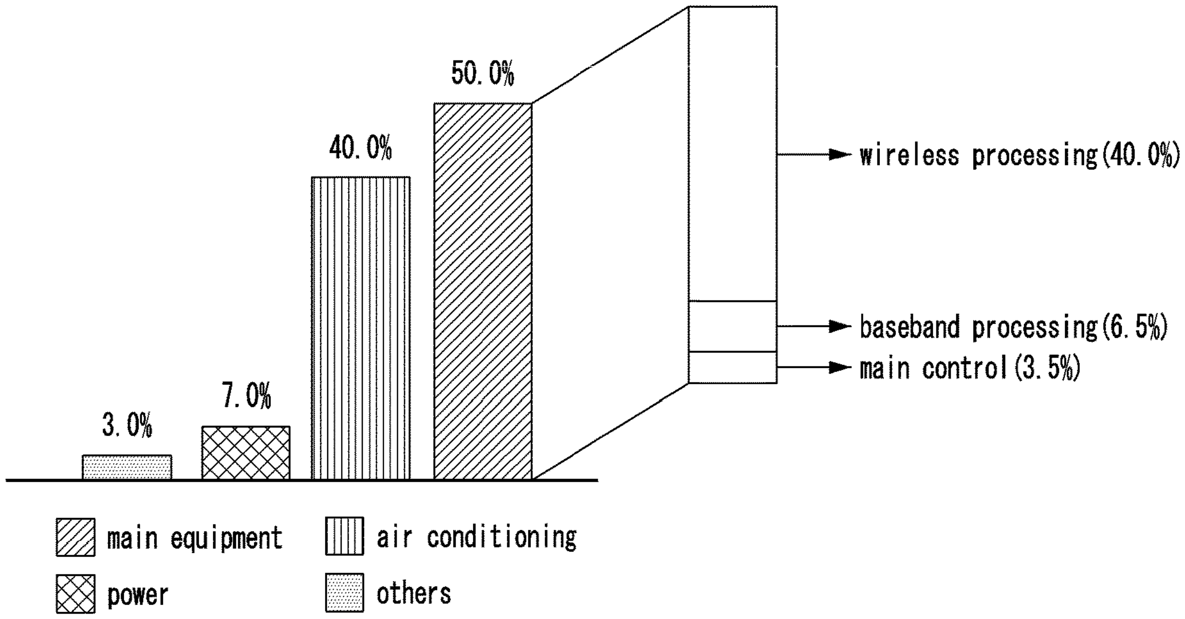
FIG. 5 is a diagram illustrating an exemplary embodiment of a base station power consumption analysis.

FIG. 5 is a diagram illustrating an exemplary embodiment of a base station power consumption analysis.

Referring to FIG. 5, base station power consumption may be divided into main equipment, air conditioning, power-related equipment, and others. The main equipment of the base station accounts for 50.0% of the base station's power consumption, the base station air conditioning accounts for 40.0% of the base station's power consumption, the base station power-related equipment accounts for 6.5% of the base station power consumption, and the remaining other equipment accounts for 3.0% of the base station power consumption. It is seen that except for air conditioning, a lot of power is consumed in the main equipment of the base station.

3GPP Release 18 Standardization

Currently, 3GPP is in the process of being standardized for the power consumption of base stations in release 18 to reduce network energy. Radio access network working group 1 (RAN1), which is a physical layer working group, is studying various schemes to reduce base station power consumption by dividing domains into a time domain, a frequency domain and a power domain. Radio access network working group 2 (RAN2), which is a protocol working group, is suggesting various schemes, and some examples thereof are as follows.

- a scheme that in a network environment in which a plurality of component carriers (CC) overlapped, common signals such as synchronization signal block (SSB)/system information block (SIB) are transmitted only through anchor CC and are not transmitted through the remaining CCs;
- a scheme of reducing always-on signal transmission by increasing the transmission period of SSB/SIB;
- However, it is necessary to examine how such an increase of the transmission period influences a cell search and a measurement operation for radio resource management (RRM).
- discontinuous transmission (DTX): a scheme of stopping all signal transmissions and entering sleep mode in a section without data transmission in a base station in consideration of discontinuous reception (DRX) operation in a terminal;
- base station on/off: a scheme of turning on/off a small cell base station as necessary when a small cell-type capacity booster cell is placed in a macro cell base station.

If the network energy saving scheme as described above is applied to the communication system, the overall performance becomes lower than that in the case that the network energy saving scheme is not applied. Therefore, it is important to minimize performance degradation or not to affect the performance. The power consumption of the base station may be the highest in RF-related elements as shown in FIG. 5. Thus, the most efficient way to reduce the power consumption of base stations is to turn off all base stations, including RF devices.

Suggestion: Method of Turning On/Off Small Cell Base Station Using Terminal Function The present disclosure relates to a method of turning on/off a small cell base station, which is one of schemes described above, and proposes to add a device (or a functional block) which performs a terminal function to an existing device (or a functional block) which performs the base station function. BS may also be referred to as "base station unit (BSU)".

In a heterogeneous network, each of the plurality of small cell base stations, not the macro cell base station, may decide to turn off the power to save power consumption. As such, the power consumption caused by the communication (e.g., backhaul link) of each of the macro cell base station and the plurality of small cell base stations may also be reduced. Each of the plurality of small cell base stations may be overlapped in the MBS coverage.

The present disclosure may assume a heterogeneous network (HetNet)-type communication system in which a macro cell base station and a small cell base station are overlapped. The macro cell base station may mean a candidate cell of the 3GPP standard NES-related standard, and the small cell base station may mean a capacity booster cell of the 3GPP standard NES-related standard. Here, one macro cell base station may include a plurality of small cell base stations in the coverage. Each of the plurality of terminals may be connected to the macro cell base station or the small cell base station.

In the present disclosure, the macro cell base station is referred to as macro cell base station (MBS), and the small cell base station is referred to as small cell base station (SBS).

The present disclosure suggests a scheme to achieve NES by performing the operation of blocking the power of the SBS or turning on the power again according to the situation in the heterogeneous network environment as shown in FIGS. 1 and 3. To this end, the present disclosure may consider a SBS structure in which MT has been added to BS.

Figure 6:
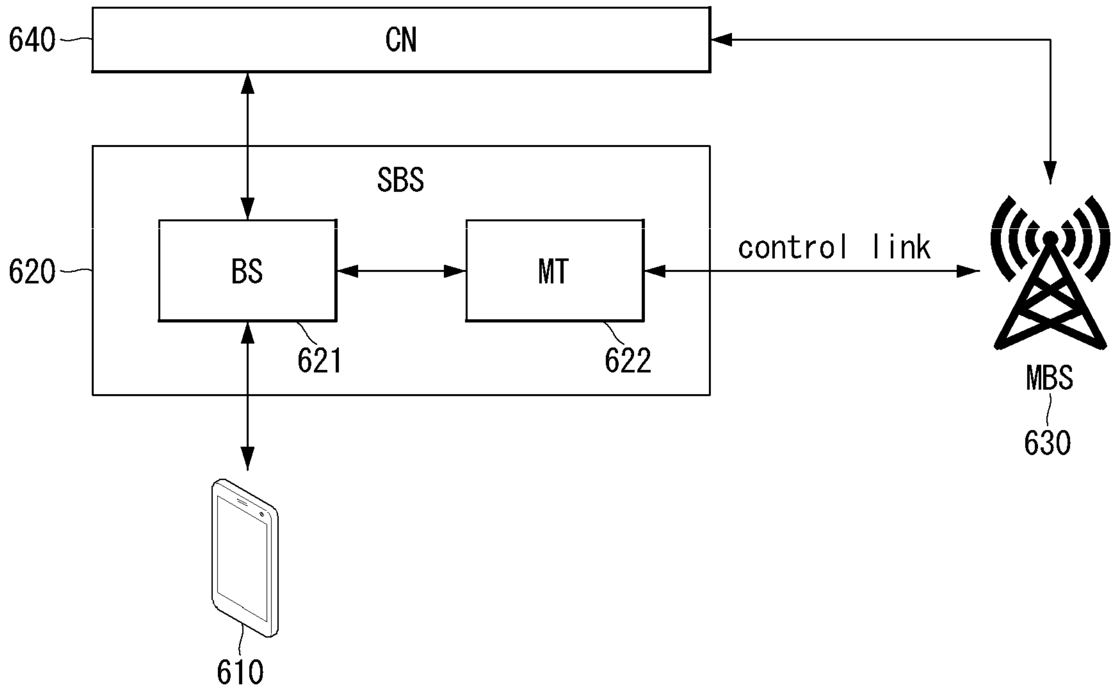
FIG. 6 is a conceptual diagram illustrating a composition of a small cell base station (SBS) according to an exemplary embodiment of the present disclosure.

FIG. 6 is a conceptual diagram illustrating a composition of a small cell base station (SBS) according to an exemplary embodiment of the present disclosure.

Referring to FIG. 6, a communication system may include a UE 610, an SBS 620, a MBS 630, and a CN 640. The communication system may support a heterogeneous network in which the coverage of the SBS 620 is overlapped within the coverage of the MBS 630, and the MBS 630 may be base stations 110-1, 110-2, 110-3, and 320 shown in FIGS. 1 and 3. The SBS 620 may be base stations 120-1, 120-2, and 330 shown in FIGS. 1 and 3, and the SBS 620 may be composed of a BS 621 and a MT 622. Each of the UE 610, the SBS 620 and the MBS 630 may be configured in the same manner as or similarly to the communication node shown in FIG. 2.

Each of the BS 621 and the MBS 630 may be wire-connected to the CN 640. In addition, although not shown in FIG. 5, the BS 621 may be connected to the CN 640 through a wireless backhaul such as an integrated access and backhaul (IAB).

The BS 621 may support a first frequency resource, and the MBS 630 may use a second frequency resource. The control link between the MT 622 and the MBS 630 may support the second frequency resource and use a wireless interface (e.g., NR Uu).

The MT 622 may be receive information required for the power on/off control of the BS 621 including the method of turning on/off the BS 621, from the BS 621 through the interface between the BS 621 and the MT 622, and the MT 622 may perform power on/off control of the BS 621 based on the information provided from the BS 621.

For example, the MT 622 may receive terminal activation information for terminals connected to the BS 621, from the BS 621. Here, the terminal activation information may include the number of terminals connected to the BS 621, and the data transmission rate (sum of the data transmission rates) of each of the terminals connected to the BS 621.

Before the BS 621 is powered off, the MT 622 may receive information on the method for handing the terminals connected to the BS 221 over to the MBS 630, from the BS 621.

For example, the MT 622 may instruct the BS 621 to hand the terminals connected to the BS 621 over to the MBS 630, and the BS 621 may perform a handover procedure of handing the terminals over to the MBS 630 according to the instruction of the MT 622. In addition, after handing all terminals connected to the BS 621 over to the MBS 630, the BS 621 may notify that the handover has been completed.

The MT 622 may be powered off/heated based on the method provided by the BS 621, and the power on/off of the BS 621 may be checked.

In the present disclosure, the SBS may add an MT to the existing base station structure as shown in FIG. 6. The added MT may perform the following functions. Here, SBS means BS.

- create and establish MBS and a control link and generate SBS context in MBS (register the presence of SBS to MBS);
- measure the location of SBS and report the location information to MBS, or measure values required for identifying the location and transmit the values to MBS;
- determine whether to turn off the power of SBS by monitoring the terminal activation level of terminals connected to SBS, and perform power off procedure of SBS;
- when the power SBS is turned off, report the power off state of SBS to MBS;
- when the power of SBS is turned off, monitor RAN paging initiated from MBS by transitioning to RRC_INACTIVE state;
- in the power off state of SBS, if a RAN paging message initiated from MBS is received, perform power on procedure of SBS.

In the present disclosure, the MT 622 may be connected to the MBS 630 through a control link which is set to the wireless interface (e.g., NR Uu), and may send and receive a signaling message. Here, the signaling may be at least one of system information (SI) signaling (e.g., transmission of system information block (SIB) and/or master information block (MIB)), radio resource control (RRC) signaling (e.g., transmission of RRC message, RRC parameter, and/or upper layer parameter), and media access control (MAC) control element (CE) signaling (e.g., transmission of downlink control information (DCI), uplink control information (UCI), and/or sidelink control information (SCI)).

In the present disclosure, the control link may be used to deliver a signaling message between the MT and the MBS. Thus, MT may not support the user plane (UP) in a communication protocol and may support only the control plane (CP). The MT may perform only the function of the access stratum (AS) layer in the CP, and may not have the function of non-access stratum (NAS) layer.

Figure 7:
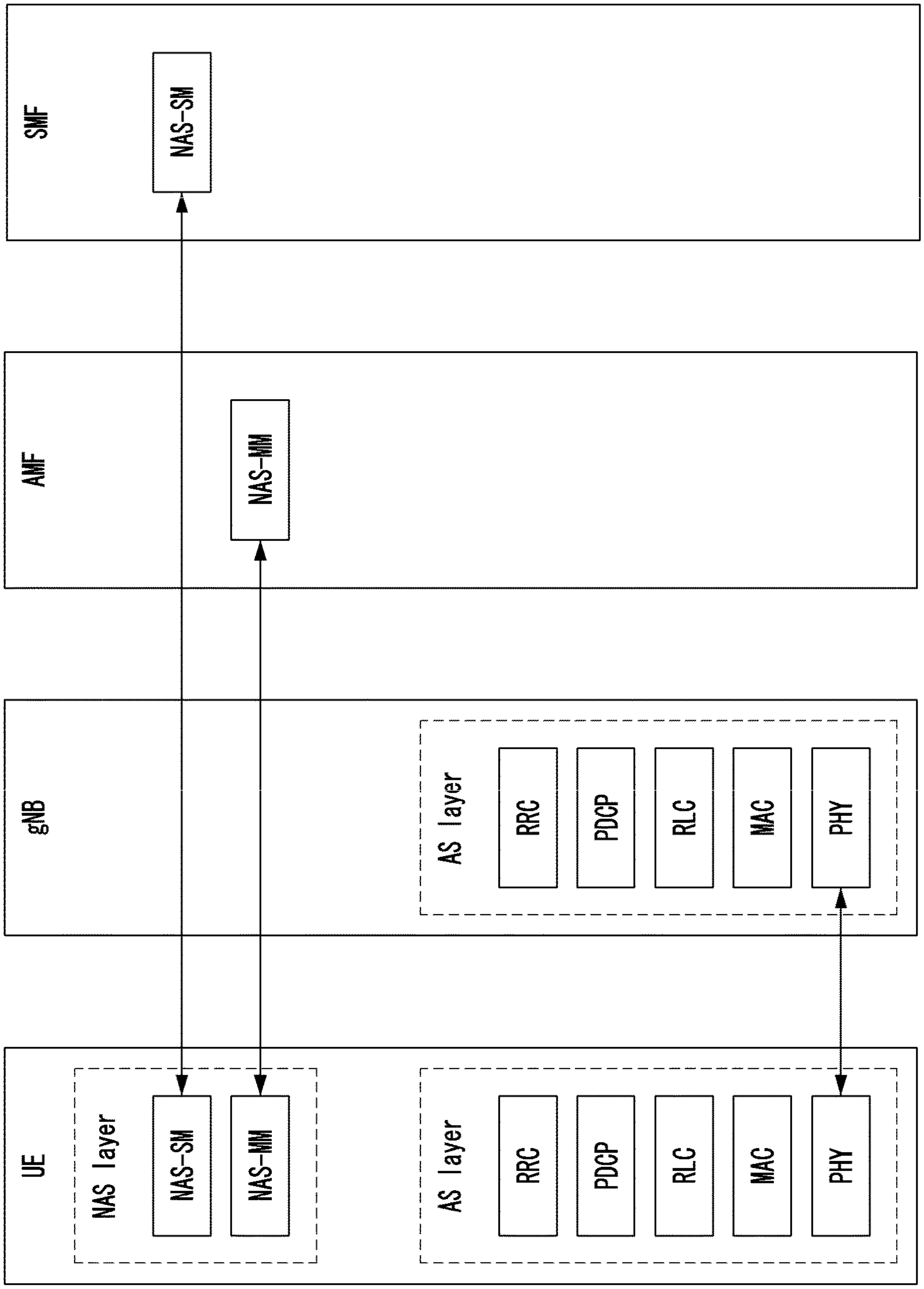
FIG. 7 is a conceptual diagram illustrating an exemplary embodiment of a control plane (CP) wireless protocol structure in a communication system.

FIG. 7 is a conceptual diagram illustrating an exemplary embodiment of a control plane (CP) wireless protocol structure in a communication system.

Referring to FIG. 7, the control plane wireless protocol may be divided into an AS layer and a NAS layer. In the present disclosure, the MT 622 may support a protocol stack below the radio resource control (RRC) and may not support access control.

The layers may be divided into a first layer (PHY layer), a second layer, a third layer (RRC layer), and the NAS layer. The second layer may include a media access control (MAC) sub-layer, a radio link control (RLC) sub-layer, and a packet data convergence protocol (PDCP) sub-layer. The NAS layer may perform a mobility management (NAS-MM) function and a session management (NAS-SM) function, etc. The AS layer may include an RRC layer, an RLC sub-layer, a MAC sub-layer, and a PHY layer located under the NAS layer.

Meanwhile, in the case of a general terminal, the terminal may prohibit or restrict an attempt to request the access of the terminal for mobile originating (MO) data or MO signaling by performing access control in the RRC layer. In the case of 4G communication system (e.g., long term evolution (LTE), LTE-advanced (LTE-A)), the terminal may support various access control techniques (e.g., access control barring (ACB), extended access control barring (EAB), application specific congestion control for data communication (ACDC), service specific access control (SSAC), etc.). In the case of the 5G communication system (e.g., new radio (NR)), the terminal may support the integrated access control (UAC).

In the present disclosure, the MT may not include a NAS layer in the user plane and the control plane. Thus, access control technique may not be applied to the MT.

Next, in the present disclosure, the contents related to the reduction of power consumption will be described. First, since MT can perform terminal functions, the RRC state and discontinuous reception (DRX) of the general terminal will be described. Thereafter, the paging monitoring operation considering the paging early indicator (PEI) and tracking reference signal (TRS) will be described.

RRC State and DRX

In the MT, the RRC layer may perform the RRC function according to the procedure defined in the 3GPP standard, and the RRC state may be defined as follows.

Figure 8:
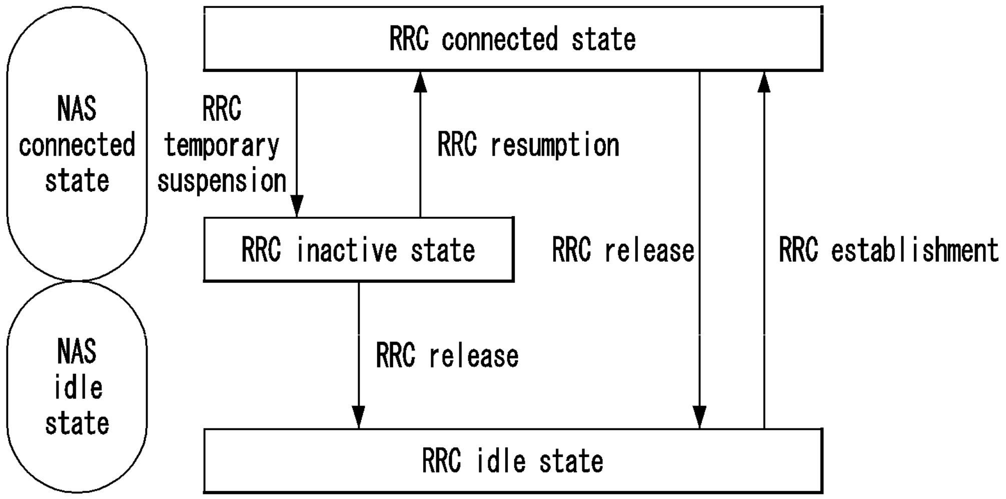
FIG. 8 is a conceptual diagram illustrating an exemplary embodiment to describe the operating state of the radio resource control (RRC) layer in a communication system.

FIG. 8 is a conceptual diagram illustrating an exemplary embodiment to describe the operating state of the radio resource control (RRC) layer in a communication system.

Referring to FIG. 8, the operating state of the terminal may be classified into an RRC_CONNECTED state, an RRC_INACTIVE state, and an RRC_IDLE state. If the terminal operates in an RRC_CONNECTED state or an RRC_INACTIVE state, RAN and the base station (e.g., MBS 620) may store and manage RRC connection setting information and/or context information (e.g., RRC context information and AS context information). The NAS signaling connection between the terminal and the core network in the RRC_INACTIVE state or the RRC_CONNECTED state may be NAS CONNECTED state, and the signaling connection between the terminal and the core network in the RRC_IDLE state may be NAS IDLE state.

If the power of the terminal is applied initially, the terminal may be in the RRC_IDLE state, and the initial connection operation can be performed through an RRC establishment procedure, and when the terminal successfully establishes the RRC connection between the terminal and the base station, the terminal may transition to the RRC_CONNECTED state. When the terminal transitions to the RRC_CONNECTED state, the context information of the terminal (e.g., RRC context information and AS context information) may be generated in the terminal and the base station, respectively. The generated context information of the terminal (e.g., RRC context information and AS context information) may be stored and managed in the terminal and the base station, respectively, and when the terminal transitions to the RRC_IDLE state, each of the terminal and the base station may delete the stored context information of the terminal (e.g., RRC context information and AS context information).

The terminal in the RRC_CONNECTED state may operate a timer (e.g., RRC_INACTIVE timer), and if there is no data transmission and reception for a certain period of time, the terminal may transition to the RRC_INACTIVE state. In the RRC_INACTIVE state, the context information of the terminal (e.g., RRC context information and AS context information) may be stored and managed in the terminal and the base station, respectively. When the terminal transitions from the RRC_INACTIVE state to the RRC_CONNECTED state, the NAS protocol may not be involved. In other words, the signaling overhead may be reduced and the fast RRC state transition may be possible.

The terminal may receive the paging initiated in the core network (e.g., AMF) in the RRC_IDLE state, and may receive the paging initiated in the RAN and the base station in the RRC_INACTIVE state. The terminal may initiate the RRC resumption procedure to transmit data in the RRC_INACTIVE state, and transmit data by transitioning to the RRC_CONNECTED state.

On the other hand, the terminal may perform DRX operation to reduce battery consumption. If there is no transmission and reception traffic, the terminal may operate in a sleep mode (RF transceiver off) for a certain period of time, and if there is transmission and reception traffic (wake-up), the terminal may transmit and receive data in the active mode (RF transceiver on). The information on when and how long the terminal is to be in the sleep mode and to be woken up may be determined by DRX setting information, and the terminal receive the DRX setting information from the base station through RRC message and/or setting information message (e.g., system information block type 2 (SIB2) message).

The terminal may perform DRX operation in the RRC_IDLE state, the RRC_INACTIVE state, and the RRC_CONNECTED state. In the RRC_IDLE state and the RRC_INACTIVE state, the DRX operation of the terminal may indicate the idle discontinuous reception (I-DRX) mode, and in the RRC_CONNECTED state, the DRX operation of the terminal may indicate connected discontinuous reception (C-CRX) mode. The RRC state and DRX operation of the terminal may have the following association.

Figure 9:
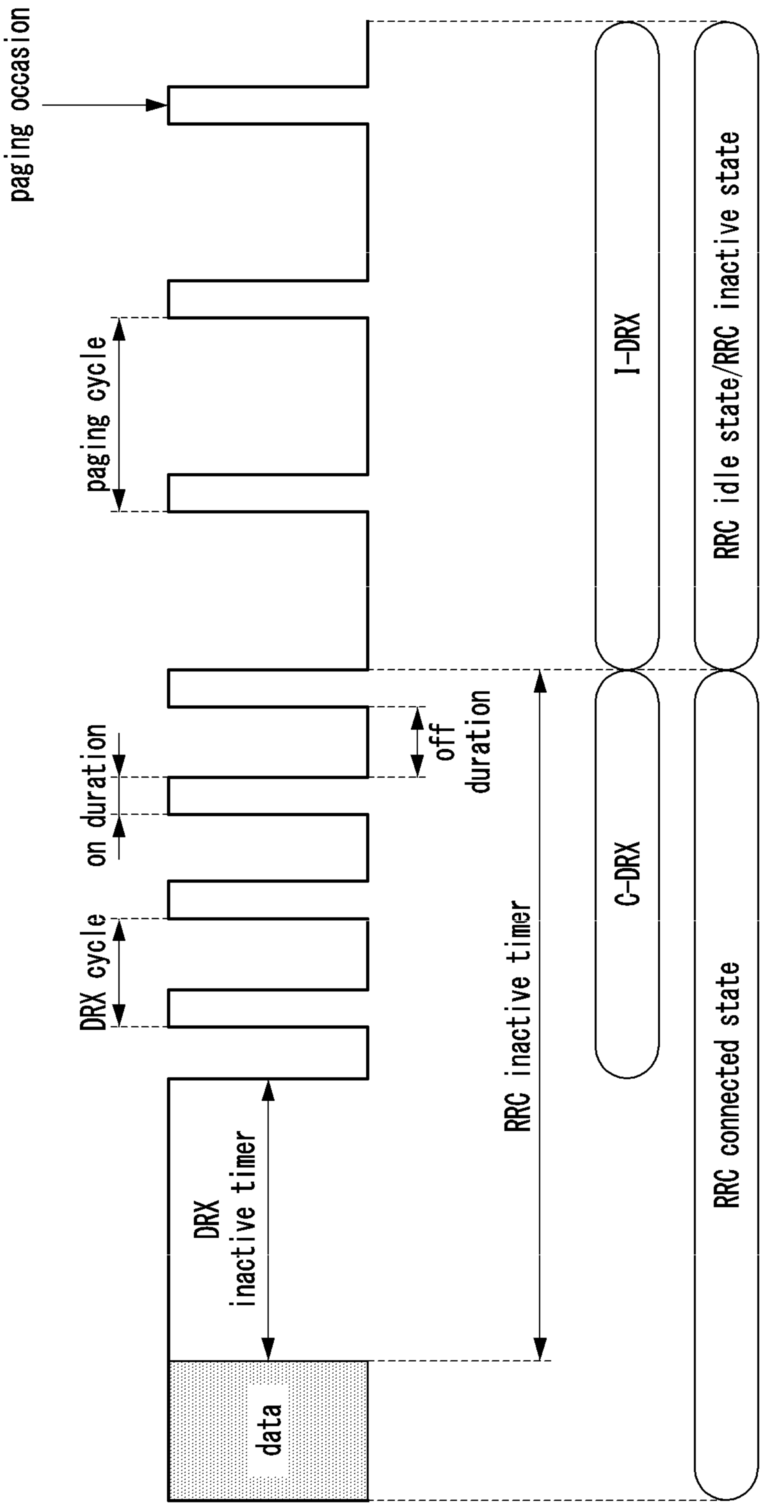
FIG. 9 is a conceptual diagram illustrating an exemplary embodiment to describe the connection between the RRC state and discontinuous reception (DRX) in a communication system.

FIG. 9 is a conceptual diagram illustrating an exemplary embodiment to describe the connection between the RRC state and discontinuous reception (DRX) in a communication system.

Referring to FIG. 9, a terminal may perform an exchange operation of data in an RRC_CONNECTED state. In this case, the terminal may monitor the transmission and reception operation of the data based on DRX_INACTIVE timer and RRC_INACTIVE timer, and when the DRX_INACTIVE timer expires, the terminal may enter C-DRX mode. In C-DRX mode, the terminal may repeat on duration and off duration for each DRX cycle, and may monitor the physical downlink control channel (PDCCH) only in the on duration. Meanwhile, the terminal may operate the RRC_INACTIVE timer, and if there is no data transmission and reception operation for a certain period of time, the terminal may transition from the RRC_CONNECTED state to the RRC_INACTIVE state and enter the idle DRX (I-DRX) mode. The terminal may monitor a paging message in the I-DRX mode at each paging DRX cycle. In general, the wake-up cycle of I-DRX mode may be longer than the wake-up cycle in the connected DRX (C-DRX) mode. Since the terminal search space monitored in I-DRX mode may be reduced, the terminal may reduce power consumption in I-DRX mode than C-DRX mode.

As described above, in the present disclosure, the MT may perform the function of the wireless connection protocol defined in the 3GPP standards and function of changing the power on/off state of the SBS under the control of the MBS. However, if the power consumption of the added MT itself is large, it may be contrary to the object of the present disclosure to reduce the power consumption of base station. Thus, in order to minimize the power consumption of MT itself, MT may basically operate in the RRC_INACTIVE state.

As described above, the terminal operating in the RRC_INACTIVE state may have a small signaling overhead in performing the state transition to the RRC_CONNECTED state for data transmission. In addition, by performing paging monitoring in I-DRX mode, the terminal may reduce the power consumed.

Paging Monitoring Using Paging Early Indicator (PEI) and Tracking Reference Signal (TRS)

Figure 10:
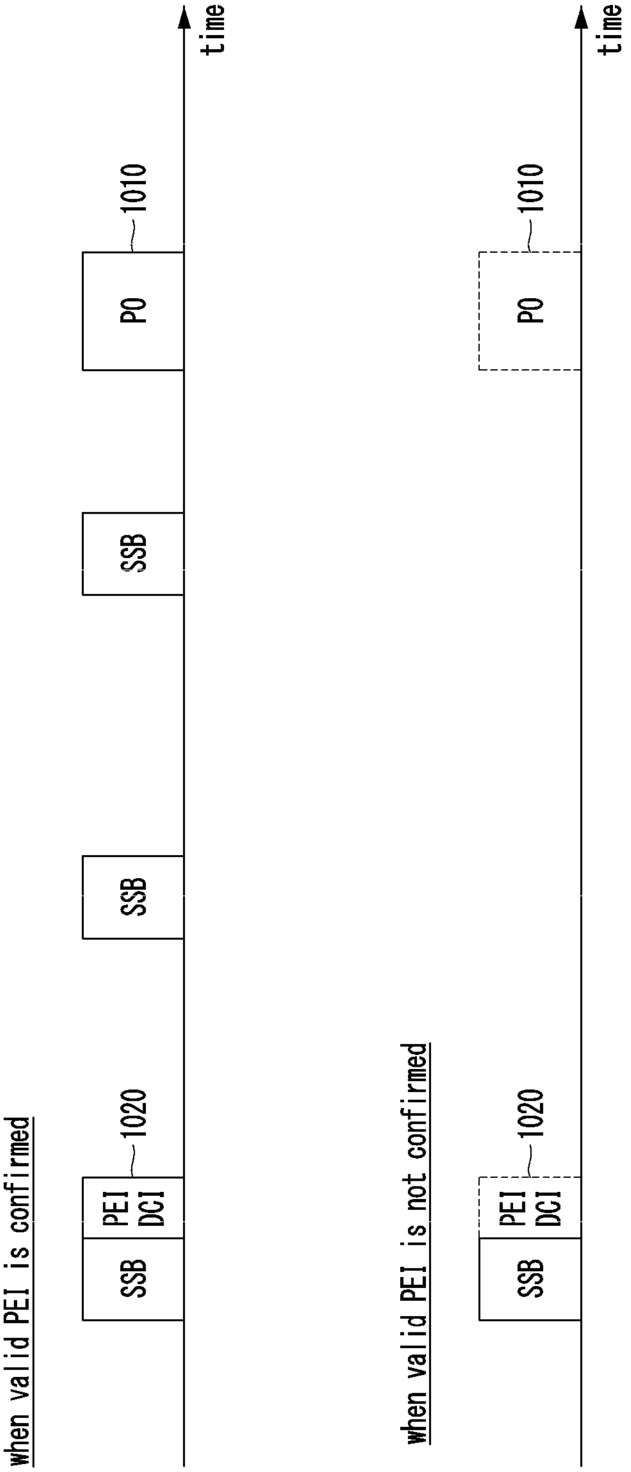
FIG. 10 is a conceptual diagram illustrating an exemplary embodiment of a paging monitoring operation using a paging early indicator (PEI) in a communication system.

FIG. 10 is a conceptual diagram illustrating an exemplary embodiment of a paging monitoring operation using a paging early indicator (PEI) in a communication system.

Referring to FIG. 10, the base station may dynamically control paging monitoring for terminals in the RRC_IDLE state and the RRC_INACTIVE state. The terminal may monitor a DCI, that is, a PEI DCI 1020, which indicates the paging at a sufficiently early point of time than a paging occasion (PO) 1010. When the PEI DCI 1020 is received and a valid paging indicator is confirmed in the PEI DCI 1020, the terminal may determine that the terminal itself will be called soon, and may monitor the next PO 1030. On the other hand, if the terminal does not receive the PEI DCI 1030 or a valid paging indicator is not confirmed in the PEI DCI 1030, the terminal may determine that the terminal itself will not be called in the next PO 1040, and may operate in the sleep state.

Figure 11:
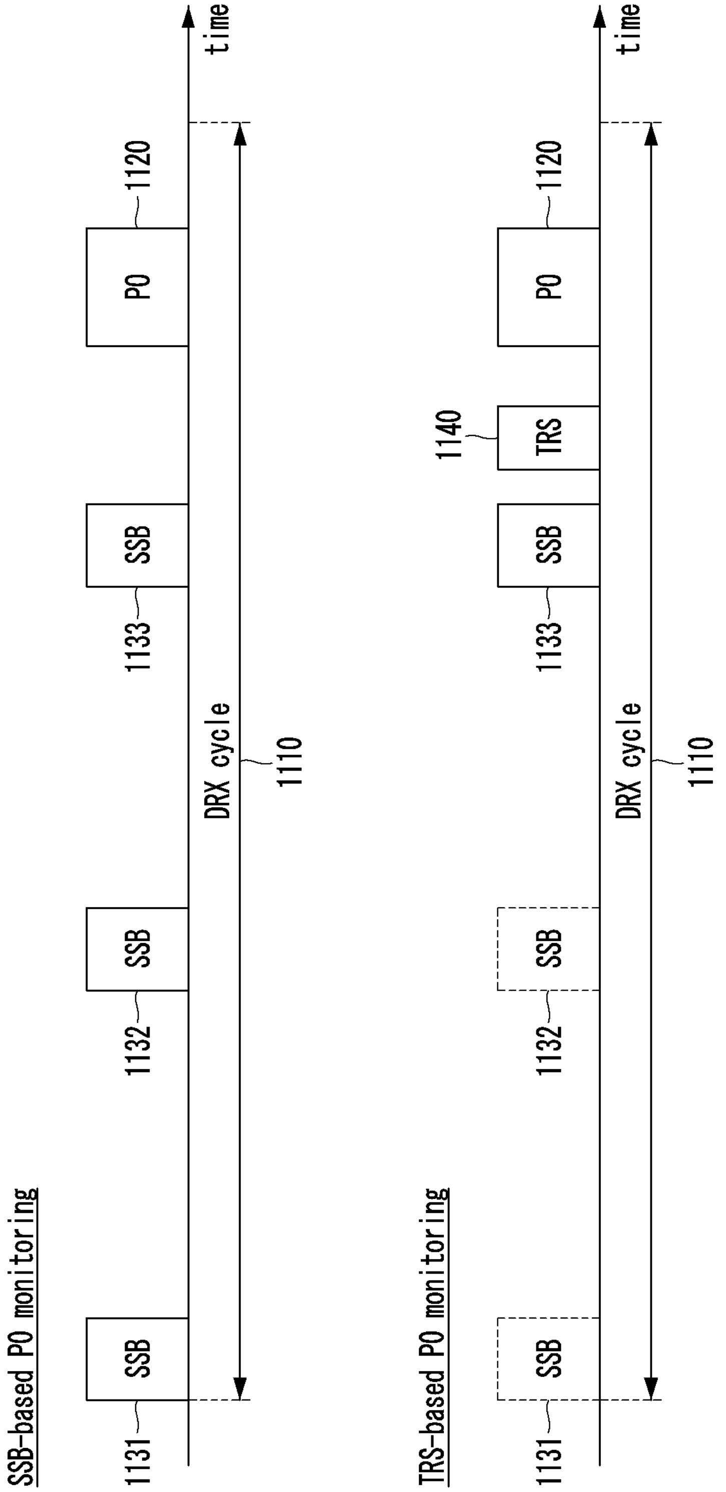
FIG. 11 is a conceptual diagram illustrating an exemplary embodiment of a paging monitoring operation using a tracking reference signal (TRS) in a communication system.

FIG. 11 is a conceptual diagram illustrating an exemplary embodiment of a paging monitoring operation using a tracking reference signal (TRS) in a communication system.

Referring to FIG. 11, if the DRX is set, the terminal may monitor only one PO 1120 per DRX cycle 1110. The terminal in RRC_IDLE state and RRC_INACTIVE state may periodically monitor PO 1120 for each DRX cycle 1110 regardless of the SSB transmission cycle or whether the terminal itself has been actually called. In addition, the terminal may wake up earlier than the PO 1110 according to the SSB transmission cycle or the signal to interference plus noise ratio (SINR) and measure SSBs 1131, 1132 and 1133, and perform a time/frequency synchronization operation. Meanwhile, the terminal may perform accurate time/frequency synchronization without receiving a plurality of SSBs 1131 and 1132, based on the TRS 1140 which is set at a slightly earlier point than the PO 1120. One SSB 1133 may be received for the synchronization acquisition before receiving the TRS 1140, but the power consumption of the terminal may be improved.

SBS Location Information Acquisition

In the present disclosure, the MBS should identify (obtain) the location information of each of the plurality of SBSs in the cell coverage and terminals connected to the MBS for the NES. In the present disclosure, the MBS may identify (obtain) location information as follows.

The terminal (or MT) may find a beam index (synchronization signal block (SSB)) that fits the position of the terminal (or MT) through a beam search while performing the initial connection, and thereafter may find a more detailed beam index (CSI-RS) through a detailed beam search. If the user terminal transmits a preamble through a physical random access channel (PRACH) for the initial connection, the MBS may detect PRACH preamble and may measure a timing advance (TA) value corresponding to information on the distance between the terminal (or MT) and the MBS.

If the measured TA value is small, the MBS may determine that the distance between the terminal (or MT) and the MBS is short, and if the measured TA value is large, the MBS may determine that the distance between the terminal (or MT) and the MBS is long. If there is a non-line of sight (NLOS) route between the terminal (or MT) and the MBS, an exact proportional relation between TA and the distance between the terminal (or MT) and the MBS cannot be expected due to radio waves transmitted to the refracted route. However, it may be said that the TA tends to be proportional to the distance between the terminal (or MT) and the MBS. Thus, the MBS may divide the cell area into several zones, and identify (obtain) the position information of the terminal based on the divided zones as follows.

Figure 12:
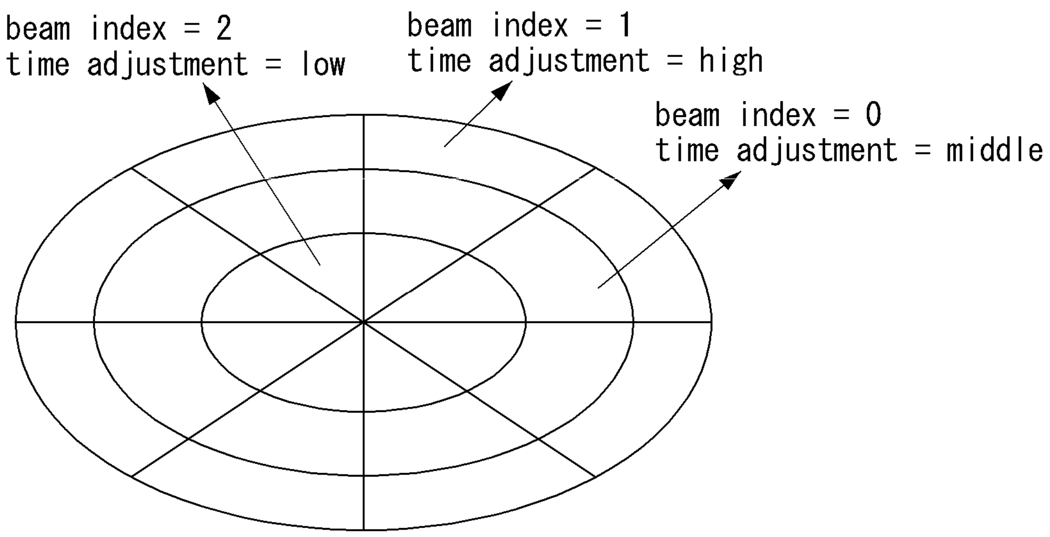
FIG. 12 is a conceptual diagram for describing terminal location information according to an exemplary embodiment of the present disclosure.

FIG. 12 is a conceptual diagram for describing terminal location information according to an exemplary embodiment of the present disclosure.

Referring to FIG. 12, the base station may divide the cell coverage into a plurality of zones for the grasp (acquisition) of the terminal location information. Each divided zone may be distinguished based on a beam index (e.g., SSB beam index) and a TA measurement value. The base station may determine the zone in which the terminal is positioned, based on the beam index (e.g., SSB beam index) the TA measurement value, which are obtained through the initial access procedure of the terminal. Here, the beam index (e.g., SSB beam index) may indicate a direction between the base station and the terminal, and the TA measurement value may indicate the distance between the base station and the terminal.

The base station may divide the cell area into 8 beam indexes (e.g., SSB beam indexes) and divide the TA into 3 sections (low, middle and high sections) in order to divide the cell area into a plurality of zones. Beam indexes (e.g., SSB beam indexes) may be mapped from 0 to 7 in the counterclockwise direction based on the horizontal axis, and TA sections may be mapped in the order of low, middle, and high as the distance between the base station and the terminal gets longer.

One exemplary embodiment shown in FIG. 12 is intended to describe the concept of the terminal location information, and may be configured differently depending on the configuration and channel environment of the communication system. This terminal location information may be applied in the same manner not only to a general terminal but also to an MT installed in an SBS.

Meanwhile, the beam index (e.g., SSB beam index) or TA measurement value, which is used to indicate the terminal location information, may be changed due to the movement, etc. of the corresponding terminal, and a procedure for updating the terminal location information identified (obtained) as a result may be necessary. Therefore, if the terminal location information needs to be updated, the terminal may perform the RA procedure, and the base station (e.g. MBS 630) may identify (obtain) location information from the terminal (e.g., UE 610 and MT 622) which has performed the RA procedure, and update the information.

In the present disclosure, location information of the terminal (e.g., UE 610 and MT 622), which is obtained through various positioning techniques (e.g., global positioning system (GPS)) and time difference of arrival (TDOA) in addition to the scheme illustrated in FIG. 11, may be applied.

SBS Registration Procedure

An SBS may be composed of a BS and an MT. In a cell planning step, when installing the SBS, the MT may perform a procedure for registering the SBS in an MBS. It is assumed that the SBS is not registered in the MBS. When the SBS is registered in the MBS, the SBS may be re-registered in the MBS.

Figure 13:
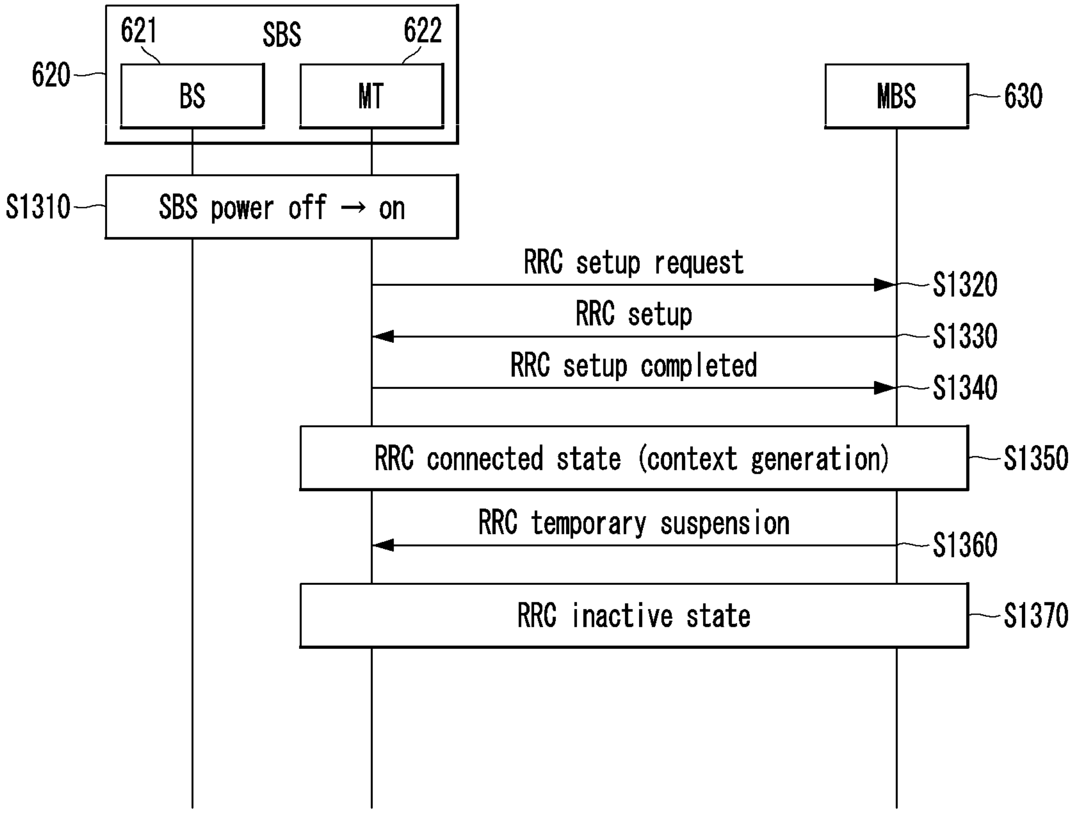
FIG. 13 is a sequence chart for describing an SBS registration procedure according to an exemplary embodiment of the present disclosure.

FIG. 13 is a sequence chart for describing an SBS registration procedure according to an exemplary embodiment of the present disclosure.

Referring to FIG. 13, a communication system may include an SBS 620, a MBS 630, and a CN 640 (not shown). The MT 622 may set RRC connection with the MBS 630, based on the RRC connection establishment procedure, and the MBS 630 may perform a registration procedure. By execution of the registration procedure, the SBS 620 context information may be generated, and an MT 622 identifier (e.g., I-RNTI) and an SBS 620 identifier (e.g., SBS ID) may be allocated. The MBS 630 may store and manage the MT 622 identifier (e.g., I-RNTI) and SBS 620 identifier (e.g., SBS ID) allocated to the generated SBS 620 context information. When the SBS 620 is registered in the MBS 630, the MBS 630 may make the MT 622 transition to the RRC_INACTIVE state in order to reduce power consumption. Here, the SBS 620 context information may be identified and confirmed by the identifier of the MT 622 (e.g., I-RNTI).

In a step S1310, when the power of SBS 620 is turned on, the MT 622 may obtain the initial synchronization and system information of the MBS 630 through the cell search and may perform a random access (RA) procedure. In accordance with the RA procedure, the MT 622 may perform a RRC connection establishment procedure (step S1320 to step S1340) to thereby set a RRC connection with the MBS 630.

In the step S1320, the MT 622 may transmit a RRC setup request (e.g., RRCSetupRequest) message to the MBS 630 using the RA procedure, and the MBS 630 may receive the RRC setup request (e.g., RRCSetupRequest) message from the MT 622.

Table 1 shows an exemplary embodiment of a RRC setup request (e.g., RRCSetupRequest) message.

TABLE 1

```
RRCSetupRequest ::=           SEQUENCE {
  rrcSetupRequest             RRCSetupRequest-IEs
}
RRCSetupRequest-IEs ::=       SEQUENCE {
  ue-Identity          InitialUE-Identity,
  establishmentCause          EstablishmentCause,
  spare            BIT STRING (SIZE (1))
}
Initialize-Identity ::=   CHOICE {
  ng-5G-S-TMSI-Part1          BIT STRING (SIZE (39)),
  random Value          BIT STRING (SIZE (39))
}
EstablishmentCause ::=        ENUMERATED {
          emergency, highPriorityAccess, mt-Access,
          mo-Signalling, mo-Data, mo-VoiceCall,
          mo-VideoCall, mo-SMS, mps-PriorityAccess,
          mcs-Priority Access, spare6, spare5,
          spare4, spare3, spare2, spare1}
```

Referring to Table 1, the RRC setup request (e.g., RRCSetupRequest) message may include a UE identity (e.g., ue-Identity) and an establishment cause (e.g., establishmentCause).

power-on of the base station to be described later or a high priority access (e.g., highPriorityAccess). The establishment cause (e.g., establishmentCause) including the indication (e.g., bs-powerOnInd) of the power-on of the base station may be shown as in Table 6.

In the step S1330, the MBS 630 may transmit an RRC setup (e.g., RRCSetup) message to the MT 622. The MT 622 may receive the RRC setup (e.g., RRCSetup) message from the MBS 630 as a response to the RRC setup request (e.g., RRCSetupRequest) message.

In the step S1340, the MT 622 may set a RRC connection with the MBS 630 based on the RRC setup (e.g., RRCSetup) message received from the MBS 630. The MT 622 may transition from the RRC_IDLE state to the RRC_CONNECTED state and may transmit a RRC setup complete (e.g., RRSetupComplete) message to the MBS 630. The MBS 630 may receive a RRC setup complete (e.g., RRCSetupComplete) message from the MT 622. The RRC setup complete (e.g., RRCSetupComplete) message may be a modified message of the existing RRC setup complete (e.g., RRCSetupComplete) message, or a newly defined message.

Table 2 shows an exemplary embodiment of the existing RRC setup complete (e.g., RRCSetupComplete) message.

TABLE 2

```
RRCSetupComplete ::=                SEQUENCE {
  rrc-TransactionIdentifier         RRC-TransactionIdentifier,
  criticalExtensions        CHOISE {
    rrcSetupComplete                RRCSetupComplete-IEs,
    criticalExtensionsFuture          SEQUENCE { }
  }
}
RRCSetupComplete-IEs                SEQUENCE {
  selectedPLMN-Identity             INTEGER (1..maxPLMN),
  registeredAMF             RegisteredAMF,
  guami-Type         ENUMERATED {native, mapped},
  s-NSSAI-List       SEQUENCE (SIZE (1..maxNrofS-NSSAI)) OF S-NSSAI,
  dedicatedNAS-Message              DedicatedNAS-Message,
  ng-5G-S-TMSI-Value                CHOICE {
    ng-5G-S-TMSI            NG-5G-S-TMSI,
    ng-5G-S-TMSI-Part2                BIT STRING (SIZE (9)),
  }
  lateNonCriticalExtension          OCTET STRING,
  nonCriticalExtension        RRCSetupComplete-v1610-IEs
}
```

The size of the terminal identifier (e.g., ue-Identity) is 39 bits, and a part (39 bits from the right side of the total bits) of the unique identifier (e.g., 5G S-temporary mobile subscriber identity (5G-S-TMSI)) allocated from the CN 640 (e.g., AMF), or 39-bit random value may be used.

The MT 622 that does not support the NAS layer cannot be connected to the CN 640 (e.g., AMF) and may be unregistered in the CN 640 (e.g., AMF). That is, the MT 622 cannot be assigned a unique identifier (5G-S-TMSI) from the CN 640 (e.g., AMF). Thus, the MT 622 may use only a 39-bit random value as the terminal identifier (e.g., ue-Identity).

In general, when a terminal connects to a base station through an initial access procedure, the cause of establishment (e.g., establishmentCause) may be set in an upper layer (e.g., NAS layer).

The MT 622 may transmit the RRC setup request (e.g., RRCSetupRequest) message including a preset establishment cause (e.g., establishmentCause) to the MBS 630. Here, the preset establishment cause (e.g., establishmentCause) may be indication (e.g., bs-powerOnInd) of the Referring to Table 2, the existing RRC setup complete (e.g., RRCSetupComplete) message may include NAS message (e.g., initial NAS message for requesting AMF registration of the terminal) IE (e.g., DedicatedNAS-Message IE) for transmitting NAS layer information between the terminal 610 and a CN 640 (e.g., AMF).

The MT 622, which does not support the NAS layer, may transmit a modified RRC setup complete (e.g., RRCSetupComplete) message or a newly defined RRC setup complete message to the MBS 630. Here, the modified RRC setup message may be a message that does not include IEs and parameters associated with the NAS layer in the existing RRC setup complete (e.g., RRCSetupComplete) message shown in Table 2.

In the step S1350, the MBS 630 may perform an SBS 620 registration process based on the RRC setup complete (e.g., RRCSetupComplete) message received from the MT 622. By the performed SBS 620 registration process, the SBS 620 context information may be generated, and an MT 622 identifier (e.g., I-RNTI) and an SBS 620 identifier (e.g., SBS ID) may be allocated. The MBS 630 may store and manage the MT 622 identifier (e.g., I-RNTI) and SBS 620 identifier (e.g., SBS ID) allocated to the generated SBS 620 context information. The SBS 620 context information may further include beam index information and TA measurement value (e.g., low, medium, high) for the MT 622 obtained by performing the RRC connection establishment procedure (step S1320 to step S1340). The MBS 630 may identify (or obtain) location information of the SBS 620 for each zone area unit as shown in FIG. 10 based on the context information of the SBS 620. Here, when the received RRC setup complete (e.g., RRCSetupComplete) message does not include IEs and fields related to the NAS layer, the MBS 630 may identify the received RRC setup complete (e.g., RRCSetupComplete) message as a message received from the MT 622, not a general terminal 610.

Meanwhile, in the RRC_CONNECTED state between the MT 622 and the MBS 630, the MT may further perform the following steps.

If other positioning techniques are applied in identifying (or obtaining) location information, the MT 622 may further perform a step of transmitting location information report message including location information, a location information format, and an identifier (e.g., I-RNTI) of the MT 622, based on the positioning technique, to the MBS 630. In the step of transmitting a further included location information message, the MBS 630 may store the location information in the SBS 620 context information based on the received location information report message. Here, the format of specific location information may vary depending on the technique applied.

In a step S1360, the MBS 630 may transmit an RRC release message (e.g., RRCRelease) including temporary suspension setting information (e.g., suspendConfig) to the MT 622, and the MT 622 may receive the RRC release message (e.g., RRCRelease) including temporary suspension setting information (e.g., suspendConfig) from the MBS 630. Here, the RRC release message (e.g., RRCRelease) may be a modified message of the existing RRC release message (e.g., RRCRelease), or a newly defined message. The temporary suspension setting information (e.g., suspendConfig) included in the existing RRC release message (e.g., RRCRelease) may be configured as shown in Table 3.

Table 3 shows an exemplary embodiment of the field configuration of the temporary suspension setting information (e.g., suspendConfig) included in the existing RRC release message (e.g., RRCRelease).

Referring to Table 3, the temporary suspension setting information (e.g., suspendConfig) includes a periodic ran-notification area update (RNAU) timer field (e.g., t380), a small data setting field (e.g., sdt-Config-r17), etc.

The MT 622 may not support the NAS layer and the user plane. Thus, the modified RRC release message (e.g., RRCRelease) or the newly defined message may not include the periodic ran-notification area update (RNAU) timer field (e.g., t380), the small data setting field (e.g., sdt-Config-r17), etc.

In the step S1360, in order to temporarily suspend the RRC connection between the MT 622 and the MBS 630, the MBS 630 may transmit the modified RRC release message (e.g., RRCRelease) or the newly defined message to the MT 622. The MT may receive the modified RRC release message (e.g., RRCRelease) or the newly defined message from the MT 622.

In a step S1370, the MT 622 may transition to the RRC_INACTIVE state, based on the RRC release message (e.g., RRCRelease) or the newly defined message receive from the MBS 630. The MT 622, which has transitioned to the RRC_INACTIVE state, may monitor the paging initiate from the MBS 630 in the DRX mode, based on DRX setting information and paging setting information. Each of the DRX setting information and the paging setting information may be setting information predefined setting information or setting information received from the MBS 630.

SBS Location Information Update Procedure

Since an SBS is a base station, it may basically have no mobility. However, unlike the MBS, the SBS may be installed indoors, and the change in the installed location may assumed. When the SBS is installed indoors, the channel environment may be changed as the surrounding environment or the arrangement of goods is changed, the zone shown in FIG. 10 may be measured differently. Therefore, in this case, the location information of the SBS registered in the MBS may need to be updated. In an exemplary embodiment that updates the location information of the registered SBS, the procedure performed periodically based on the timer may be considered.

Figure 14:
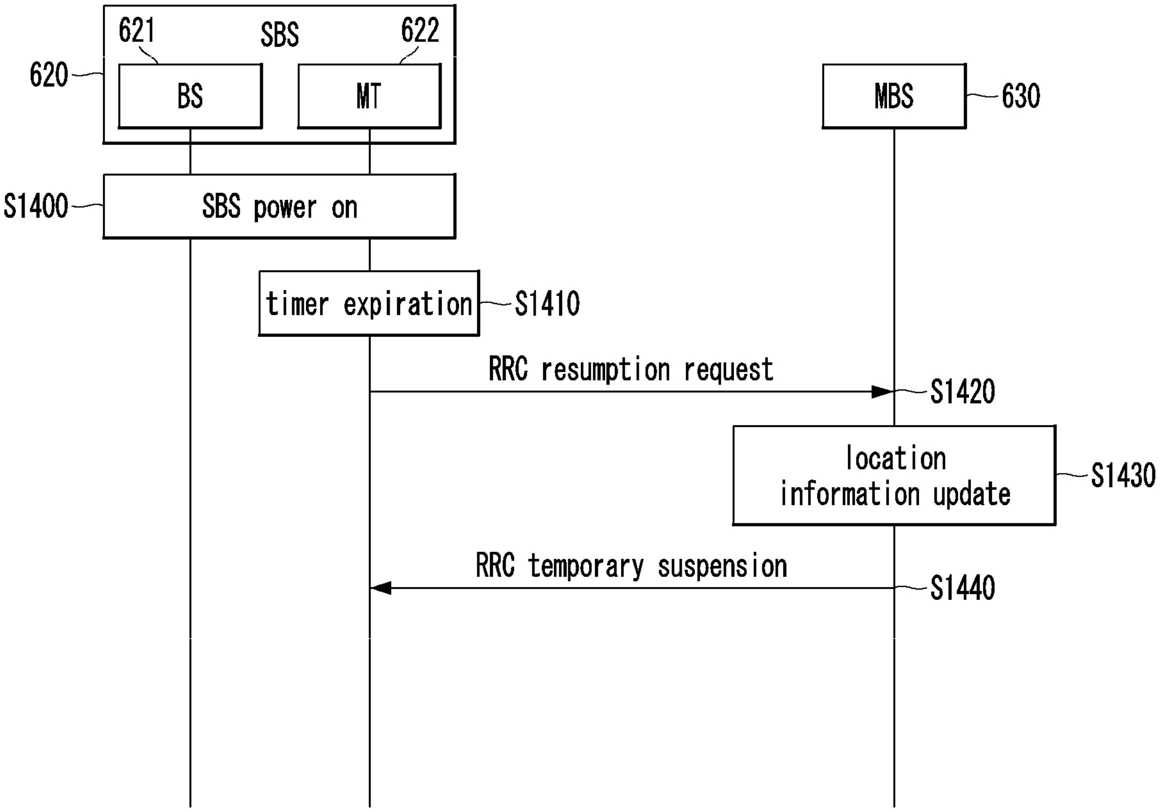
FIG. 14 is a sequence chart for describing an SBS location update procedure according to an exemplary embodiment of the present disclosure.

FIG. 14 is a sequence chart for describing an SBS location update procedure according to an exemplary embodiment of the present disclosure.

Referring to FIG. 14, a communication system may include an SBS 620, an MBS 630, etc., and the SBS 620 may include a BS 621 which performs the base station function, and an MT 622 which performs the terminal function. It is

TABLE 3

```
SuspendConfig ::=                SEQUENCE {
  fullI-RNTI                 I-RNTI-Value,
  shortI-RNTI                ShortI-RNTI-Value,
  ran-PagingCycle            PagingCycle,
  ran-NotificationAreaInfo   RAN-NotificationAreaInfo        OPTIONAL,
  t380                       PeriodicRNAU-Timer Value        OPTIONAL,
  nextHopChainingCount       NextHopChainingCount,
  ...,
  [[
  sl-UEIdentityRemote-r17    RNTI-Value                      OPTIONAL,
  sdt-Config-r17             SetupRelease { SDT-Config-r17 }  OPTIONAL,
  srs-PosRRC-Inactive-r17    SetupRelease { SRS-PosRRC-Inactive-r17 }  OPTIONAL,
  ran-ExtendedPagingCycle-r17  ExtendedPagingCycle-r17       OPTIONAL
  ]],
  [[
  ncd-SSB-RedCapInitialBWP-SDT-r17  SetupRelease {NonCellDefiningSSB-r17}  OPTIONAL,
  ]]
}
```

assumed that the SBS 620 is in a power on state in which the power is turned, the RRC connection between the MT 622 and the MBS 630 has been set, and the MT 622 is in the RRC_INACTIVE state. The MT 622 may periodically update the SBS 620 location information registered in the MBS 630 based on the set timer.

The MT 622 may periodically run a timer related to the update of location information based on the timer information which is set to update the location information registered in the MBS 630, and may determine whether the expired timer is a timer related to the location information update. Here, the timer information may be predefined information or information which is set from the MBS 630 (S1410).

If it is determined that the expired timer is a timer associated with the update of location information, the MT 622 in the RRC_INACTIVE state may initiate the RA procedure and transmit a RRC resumption request message (e.g., RRCResumeRequest or RRCResumeRequest1) including the MT 622 identifier (e.g., I-RNTI) to the MBS 630 (S1420).

The MBS 630 may identify (obtain) the beam index and TA measurement value of the MT 622 based on the RA procedure initiated in the MT 622. The MBS 630 may update location information to the identified (obtained) beam index and TA measurement value (e.g., low, middle, and high) in the context information of the SBS 620. Here, the SBS 620 context information may be identified by an identifier (e.g., I-RNTI) of the MT 622 included in the received RRC resumption request (e.g., RRCResumeRequest and RRCResumeRequest1) (S1430).

After the update of the SBS 620 location information is completed, the MBS 630 may transmit a RRC release message (e.g., RRCRelease) including temporary suspension setting information (e.g., suspendConfig) to the MT 622 in order to make the MT 622 transition to the RRC_INACTIVE state again. The MT 622 may transition to the RRC_INACTIVE state based on the RRC release (e.g., RRCRelease) message.

In a heterogeneous network, each of the plurality of SBSs, not the MBS, may decide to turn off the power to save power consumption. This may reduce power consumption due to the communication of each of the MBS and the plurality of SBSs and may also reduce the power consumption of each of the plurality of SBS.

SBS Power Off Procedure

The present disclosure proposes a case where the terminal activation level (UE activity) for the terminals connected to the SBS is equal to or smaller than a threshold as a condition for turning off the SBS. The UE activity may be defined as in Equation 1 and may mean the traffic load of SBS.

$$UE\ \text{activity} = \sum_{n=1}^{N} T(n) \qquad \text{[Equation 1]}$$

Here, "n" denotes a terminal index connected to an SBS, "T(n)" denotes the data transmission rate of the n-th terminal connected to the SBS, and "N" denotes the number of terminals connected to the SBS.

Referring to Equation 1, if the UE activity is less than a threshold, it may indicate that there is no terminal connected to the SBS, or the sum of the transmission rates of data transmitted and received (generated) by each of the plurality of terminals connected to the SBS is equal to or smaller than the threshold.

If the condition for turning off the SBS (the UE activity is equal to or smaller than the threshold) is satisfied, it may be possible to determine whether there is a terminal connected to the SBS. If the terminal connected to the SBS exists, the SBS may initiate a handover procedure so that at least one terminal connected to the SBS may be handed over to the MBS before the power is turned off. Here, the terminal may actually be connected to the BS, and the power off of the SBS may mean the power off of the BS.

If all the terminals connected to the SBS have been handed over to the MBS through the initiated handover procedure (if there is no terminal connected to the SBS), the SBS may be turned off. When the power off procedure is completed, the SBS may be turned off.

In the present disclosure, it is assumed that the coverage of the MBS may be set as a plurality of areas, and the MBS manages location information of each of the plurality of terminals connected to the plurality of SBSs overlapped within the coverage. The method of distinguishing the areas in the cell depends on the positioning technology used, so the method is not specified in the present disclosure.

In the present disclosure, the power off condition may be satisfied if the UE activity is equal to or smaller than the threshold, and the UE activity may be defined as in Equation 1. The handover procedure follows the procedure defined in the standards (e.g., 3GPP standards).

Next, the base station power off procedure will be described. It is assumed that an SBS is in a power-on state, a control link between the SBS and an MBS has been established, and the message transmitted between the SBS and the MBS is delivered through the control link. The SBS may be composed of an MT and a BS, and the power-on state of the SBS indicates the power-on state of the BS and the power-on state of the MT, and the power-on state of the SBS indicates the power-on state of the BS and the power-off state of the MT.

Figure 15:
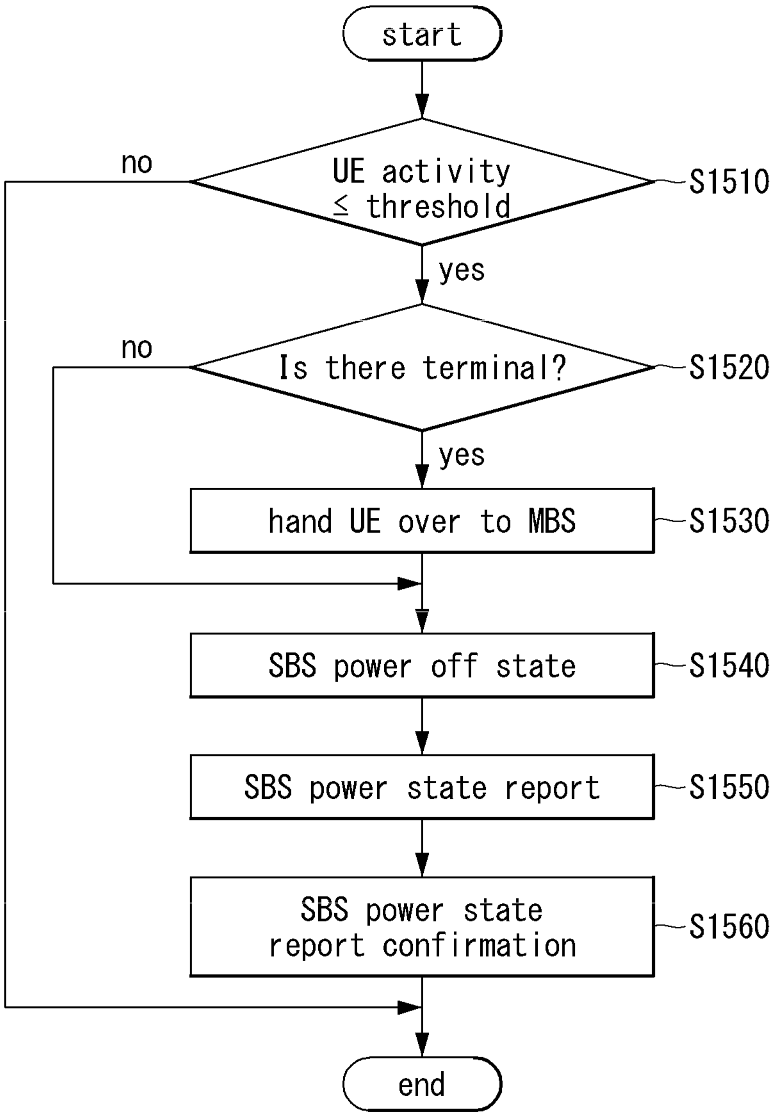
FIG. 15 is a flowchart for describing a base station power off procedure according to an exemplary embodiment of the present disclosure.

FIG. 15 is a flowchart for describing a base station power off procedure according to an exemplary embodiment of the present disclosure.

Referring to FIG. 15, an SBS may be turned off when the power off condition is satisfied. If there are one or more terminals connected to the SBS, the SBS may turn off the power after handing the connected terminals over to the MBS. If there is no terminal connected to the SBS, the SBS may immediately turn off the power. The SBS may turn off the power and then transmit the power-off state report message to the MBS and receive a power-off state report confirmation message from the MBS in response thereto.

In a step S1510, an MT can determine whether a power off condition is satisfied. If the power off condition is satisfied, the MT may perform a step S1520 in order to determine whether there is a terminal connected to a BS before turning off the power of the BS. If the power off condition is not satisfied, the MT may terminate the power off procedure of the base station.

In the step S1520, the MT may determine whether there is a terminal connected to the BS. If there is a terminal connected to the BS, the MT may perform a step S1530 in order to hand terminals connected to the BS over to the MBS. On the other hand, if there is no terminal connected to the BS, the MT may perform a step S1540 immediately to turn off the BS immediately.

In the step S1530, the MT may instruct the handover so that at least one terminal connected to the BS may be handed over to the MBS. By the handover instruction of the MT, the BS may initiate the handover procedure for each of at least one terminal connected to BS so that each of the at least one terminal connected to BS may be handed from the BS over to the MBS. When the handover is completed for all terminals connected to the BS 621 (when there is no terminal connected to the BS 621), the MT may perform the S1540 of turning off the BS.

The MT may instruct the BU to perform a handover procedure through a predefined interface between the BS and the MT, and the BS may initiate the handover procedure by the instruction of the MT. In addition, the MT may determine whether there is a terminal connected to the BS.

In the step S1540, the MT may instruct the BSU to power off the BSU, and when the BSU is powered off, the MT may perform step a S1550 to report the power-off state of the SBS to MBS. Here, the power-off state of the SBS indicates the power-off state of the BSU and the power-on state of the MT. The MT may turn off the BS through the predefined interface between the BS and the MT and confirm the power-off state of the BS.

In the step S1550, the MT may transmit a base station state report message, which indicates the power-off state of the SBS, to the MBS. The MBS may receive the base station state report message, which indicates the power-off state of the SBS, from the MT, and update the power state from on to off in the SBS context information. Here, the SBS context information may be identified and confirmed by the identifier of the MT (e.g., I-RNTI).

In the step S1560, the MBS may transmit the base station power state report confirmation message to the MT, and the MT may receive the base station power state report confirmation message from the MBS. The MT may receive the base station power state report confirmation message from the MBS and transition to the RRC_INACTIVE state. Here, the base station power state report confirmation message may be a RRC temporary suspension message to make the MT transition to the RRC_INACTIVE state.

Figure 16:
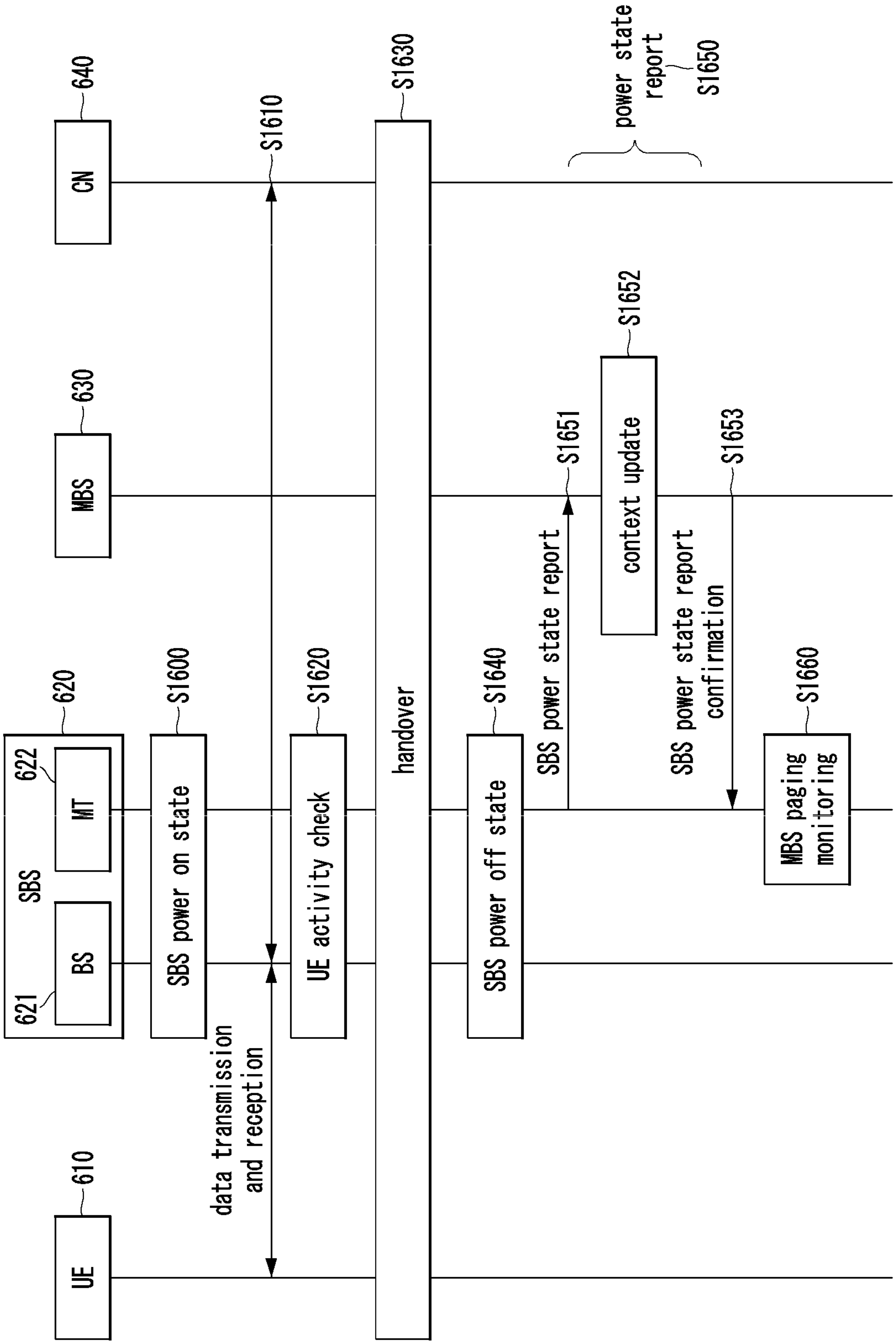
FIG. 16 is a sequence chart for describing a base station power off procedure according to an exemplary embodiment of the present disclosure.

FIG. 16 is a sequence chart for describing a base station power off procedure according to an exemplary embodiment of the present disclosure.

Referring to FIG. 16, a communication system may include a UE 610, an SBS 620, a MBS 630, and a CN 640. The communication system may support a heterogeneous network in which the coverage of the SBS 620 is overlapped within the coverage of the MBS 630, and the MBS 630 may be base stations 110-1, 110-2, 110-3, and 320 shown in FIGS. 1 and 3. The SBS 620 may be base stations 120-1, 120-2, and 330 shown in FIGS. 1 and 3, and the SBS 620 may be composed of a BS 621 and a MT 622. The SBS 620 may determine the terminal activation in the power-on state and perform a power off procedure. If the state of the SBS 620 is changed to the power-off state, the MT 622 may transmit the power-off state report message of the SBS 620 to the MBS 630. In response thereto, the MBS 630 may transmit the power-off state report confirmation message, which instructs temporary suspension of the connection of the control link, to the MT 622. The MT 622 may receive the power-off state report confirmation message from the MBS 633 and transition to the RRC_INACTIVE state. The MT 622 may monitor the RAN paging initiated from the MBS, in the RRC_INACTIVE state. It is assumed that the SBS 620 is in the power-on state, and the MT 622 is in the RRC_INACTIVE state. One terminal 610 and one 620 are illustrated for the convenience of the description. A plurality of terminals may be connected to one SBS 620 for communication. In addition, although one SBS 620 connected to one MSB 630 is illustrated in the example of FIG. 16, two or more SBSs may exist in one MBS 630.

In a step S1610, each of the plurality of terminals may transmit and receive data to and from the CN 640 through the connected BS 621.

In a step S1620, the MT 622 may determine the terminal activation and determine whether the power off condition of the BS 621 is satisfied. That is, if the UE activity of the BS 622 is equal to or smaller than a threshold, the MT 622 may power off the BS 621. A predefined value may be used as the threshold used in the power off condition, and may also be dynamically set in consideration of the transmission rate of data which may be provided to the MBS after the handover.

As an exemplary embodiment that dynamically sets the threshold value, the MBS 630 may transmit a terminal activation setting information message including the changed threshold, to the MT 622, based on the periodically performed SBS location update procedure.

As another exemplary embodiment, when it is necessary to change the threshold of the SBS 620, the MBS 630 may determine that the SBS 620 is in a power-on state and initiate the RAN paging message indicated to the MT 622. The MT 622 may be connected to the MBS 630 by the initiated RAN paging message, and the MBS 630 may transmit the terminal activation setting information message including the changed threshold, to the MT 622.

In order to connect to the MBS 630, the MT 622 may transmit a RRC resumption request (e.g., RRCResumeRequest and RRCResumeRequest1) message to the MBS 630. Here, the RRC resumption cause (e.g., ResumeCause) may be set as another cause (e.g., highPriorityAccess), not base station power on indication (e.g., bs-powerOnInd) and base station power off indication (e.g., bs-powerOffInd).

The MT 622 may change the threshold of the power off condition by using the received terminal activation setting information. The terminal activation setting information may include the threshold and the applied time point of the power off condition. The applied time point included in the terminal activation information means a time point when a threshold included in the terminal activation information is applied to the power off condition from a time point when receiving the terminal activation information. The applied time point included in the terminal activation information may only be applied once. In addition, when the applied time point is not included in the terminal activation information, it may be applied immediately or at a predefined time point.

In a step S1630, the MT 622 may determine whether the terminal connected to the BS 621 exists before the BS 621 is powered off. If there is a terminal connected to the BS 621, the MT 622 may instruct the BS 621 to hand the terminals connected to the BS 621 from the BS 621 over to the MBS 630. When the handover is completed for all terminals connected to the BS 621 (when there is no terminal connected to the BS 621), the MT 622 may perform the S1630 of turn off the BS 621. As a result of determining whether there is a terminal connected to the BS 621, if the terminal connected to the BS 621 does not exist, the MT 622 may immediately perform the step S1640 to power off the BS 621.

By the instruction of the MT 622, the BS 621 may initiate the handover procedure so that the connected terminals may be handed from the BS 621 over to the MBS 630. The terminals connected to the BS 621 may perform a handover procedure initiated from the BS 621 and may be handed from the BS 621 over to the MBS 630. Here, the source base station is the BS 621, and the target base station becomes the MBS 630 and follows the handover procedure defined in the standards (e.g., 3GPP standards). The handover procedure may be performed for all terminals connected to the BS 621.

In the step S1640, the MT 622 may instruct the BS 621 to be powered off. When the BS 621 is powered off, the MT 621 may perform a power state report procedure (S1650) in order to report to the MBS 630 that the SBS 620 is in the power-off state.

In the step S1650, the MT 622 may transmit a base station power state report message indicating the power-off state of the SBS 620 to the MBS 630, and the MBS 630 may receive a base station power state report message, which indicates the power-off state of the SBS 620, from the MT 622 (S1651). The MBS 630 may update the power state from on to off in the SBS 620 context information, based on the received base station power state report message (S1652). Next, the MBS 630 may transmit the base station power report confirmation message to the MT 622, and the MT 622 may receive the base station power report confirmation message from the MBS 630. The MT 622 may transition to the RRC_INACTIVE state, based on the received base station power state report confirmation message (S1653).

In a step S1660, the MT 622 in the RRC_INACTIVE state may receive a RAN paging message by monitoring the RAN paging initiated in the MBS 630, based on the DRX setting information and paging setting information.

As another exemplary embodiment of the SBS power off procedure, the MBS 630 may power off the SBS 620. Here, powering off the SBS 620 means changing the state of the SBS 620 to the power-off state. Here, what is actually powered off is the BS 621.

When the power off of the SBS 620 is necessary, the MBS 630 may initiate a RAN paging message indicated to the MT in which the SBS 620 is in the power-on state. The MT 622 may be connected to the MBS 630 by the initiated RAN paging message, and the MBS 630 may transmit a base station power off command message, which instructs the SBS 620 to powered off, to the MT 622. The MT 622 may perform the S1630 to the S1650 of the SBS power off procedure using the base station power off command message received from the MBS 630.

SBS Power on Procedure

The MBS may determine whether to power on at least one SBS in the power-off state, based on the location information of each of the plurality of terminals connected to the plurality of SBS. That is, if the UE activity of a specific area (e.g., an SBS coverage area in a zone or power off state) is greater than the threshold, and there is an SBS in the power-off state, the MBS may determine the power-on of the SBS. The UE activity of a specific area may be represented by the sum of data transmission rates of respective terminals which are located in the specific area and are connected to the MBS, as shown in Equation 1.

Hereinafter, the base station power on procedure will be described. It is assumed that an SBS is in a power-off state, a control link between the SBS and an MBS has been established, and the message transmitted between the SBS and the MBS is delivered through the control link. The MT operates in the RRC_INACTIVE state and monitors RAN paging initiated from the MBS. Since the location information of the SBS is reported from the MT, the location information may be known in the MBS.

Figure 17:
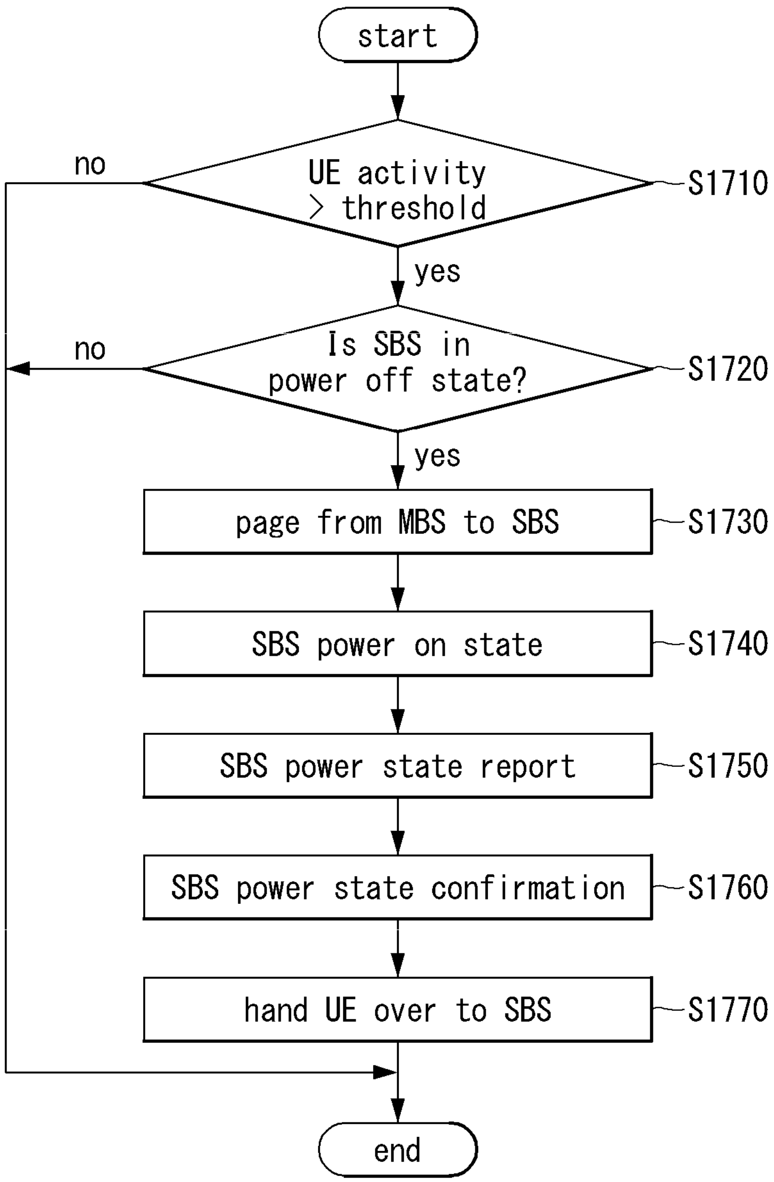
FIG. 17 is a flowchart for describing a base station power on procedure according to an exemplary embodiment of the present disclosure.

FIG. 17 is a flowchart for describing a base station power on procedure according to an exemplary embodiment of the present disclosure.

Referring to FIG. 17, if the UE activity of the first area is greater than the threshold and there is an SBS in the power-off state, the MBS may power off the SBS. When the SBS is powered on (when the state SBS is changed to the power-on state), each of the terminals located in the first area may be handed from the MBS over to the SBS. The handover procedure may be initiated by the MBS or may also be initiated by each of the terminals located in the first area. Here, the first area may mean one area of a MBS cell coverage which is set as a plurality of areas. Here, in the SBS in the power-off state, what is actually powered off is the BS, and the power-on of the SBS means the power-on of the BS.

In a step S1710, the MBS may compare the UE activity of the first area with the threshold to determine whether the UE activity of the first area exceeds the threshold. If the UE activity of the first area exceeds the threshold, the MBS may perform a step S1720 to determine whether there is an SBS in the power-off state in the first area.

In the step S1720, when there is an SBS in the power-off state in the first area, the MBS may determine the power-on of the SBS. If the power-on of the SBS is determined, steps S1730 to S1770 may be performed.

In the step S1730, the MBS may initiate a RAN paging message indicated by MT to power on the SBS (to change the state of the SBS to the power-on state), and the MT may receive the initiated RAN paging message from the MBS. When receiving a RAN paging message initiated from the MBS, in the power-off state of the SBS, the MT may perform a step S1740 to power on the SBS (to change the state of the SBS to the power-off state).

In the step S1740, the MT may power on the BS and check whether the BS is powered on. When the BS is powered on, the MT may perform the step S1750 to report the power-on state of the SBS to the MBS.

In the step S1750, the MT may transmit the base station state report message indicating the power-on state of the SBS to the MBS, and the MBS may receive the base station state report message indicating the power-on state of the SBS from the MT. Based on the received base station state report message, the MBS may update the power state from off to on in the SBS context information.

In the step S1760, the MBS may transmit the base station power state report confirmation message to the MT, and the MT may receive the base station power state report confirmation message from the MBS. Here, the base station power state report confirmation message may be a RRC temporary suspension message to make the MT transition to the RRC_INACTIVE state.

In the step S1770, each of the terminals located in the first area may perform the handover procedure in order to be handed from the MBS over to the SBS. The handover procedure may be initiated from the MBS or may be initiated based on channel state information measured for each of the terminals located in the first area.

The MBS may initiate the handover procedure before updating the SBS context information in the step S1750, and may also be initiated after transmitting the base station power state report confirmation message to the MT in the step S1760.

Figure 18:
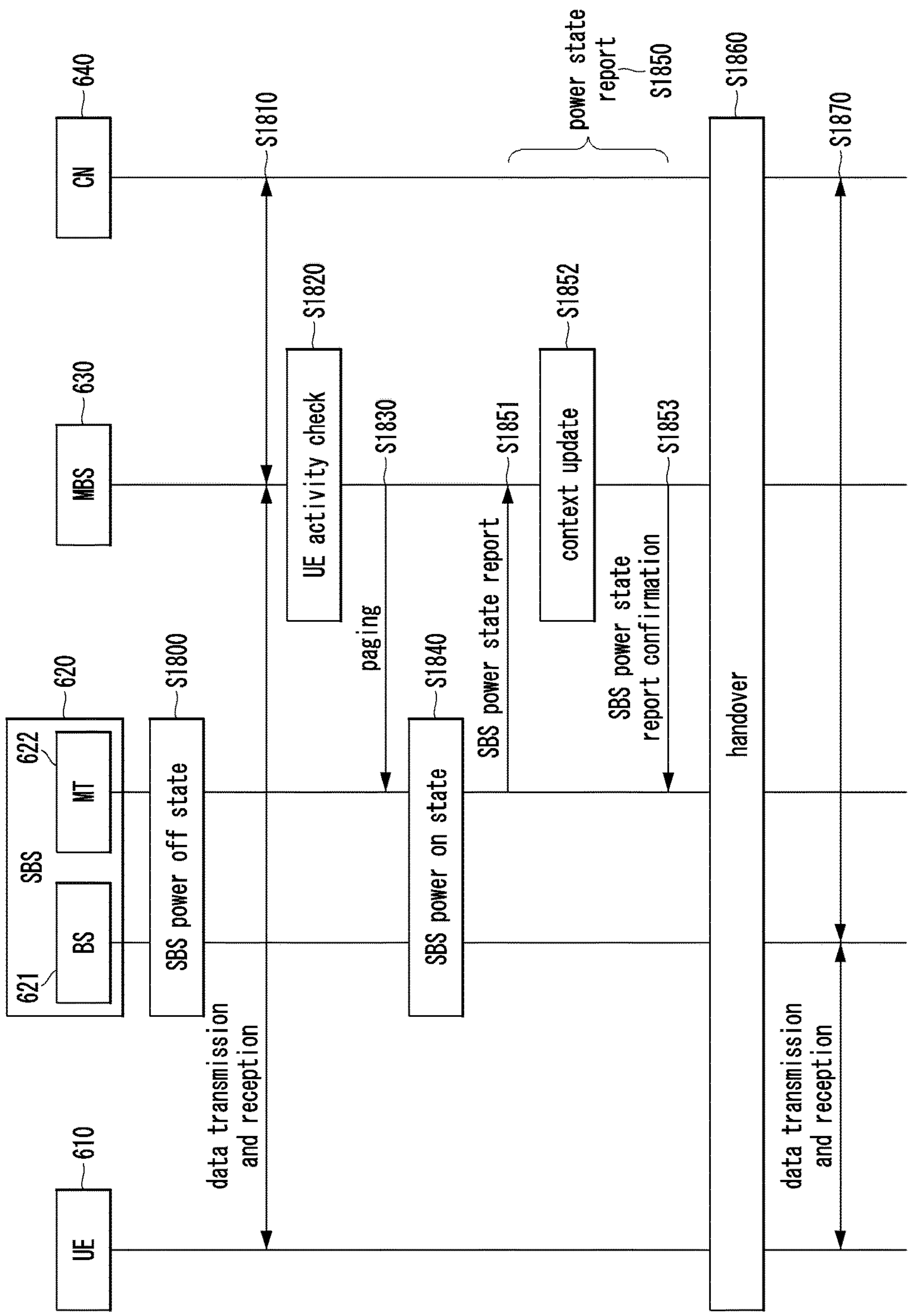
FIG. 18 is a sequence chart for describing a base station power on procedure according to an exemplary embodiment of the present disclosure.

FIG. 18 is a sequence chart for describing a base station power on procedure according to an exemplary embodiment of the present disclosure.

Referring to FIG. 18, a communication system may include a UE 610, an SBS 620, a MBS 630, and a CN 640. The communication system may support a heterogeneous network where the coverage of the SBS 620 within the coverage of the MBS 630 is overlapped, and the SBS 620 may be composed of BS 621 and MT 622. The MBS 630 may check the UE activity to thereby determine whether to power on the SBS 620 in the power-off state. If the power-on of the SBS 620 in the power-off state is determined, the MBS 630 may instruct the SBS 620 to be powered on. When the power-on of the SBS 620 is confirmed, the MBS 630 may initiate the handover procedure so that each of the terminals connected to the SBS 620 coverage may be handed over to the SBS 620. It is assumed that the SBS 620 is in a power-off state, and the MT 622 is performing the paging monitoring operation in the RRC_INACTIVE state (S1800). One terminal 610 and one 620 are illustrated for the convenience of the description. A plurality of terminals may be connected to one SBS 620 for communication. A plurality of terminals may be located within the coverage of SBS 620 in the power-off state in the MBS 630 cell coverage which is set as a plurality of areas. In addition, although one SBS 620 connected to one MSB 630 is illustrated in the example of FIG. 18, two or more SBSs may exist in one MBS 630.

In a step S1810, each of the plurality of terminals may transmit and receive data to and from the CN 640 through the connected MBS 630.

In the step S1820, the MBS 630 may determine the power-on of the SBS 620 that has a UE activity, which is greater than the threshold, and is in the power-off state, in the MBS (630) cell coverage which set as a plurality of areas through the UE activity check. The MBS 630 may check the UE activity periodically by the set timer or non-periodically by an event (e.g., radio link failure (RLF) event, etc.).

In a step S1830, the MBS 630 may initiate a RAN paging message indicated by MT 622 and transmit it to MT 622. The MT 622 may receive a RAN paging message initiated from the MBS 630, from the MBS 630. If the RAN paging message initiated from the MBS 630 is received, the MT 622 may perform a step S1840 to power on the BS.

In the step S1840, the MT 622 may power on the BS. When the BS is powered on, the MT 622 may perform a base station power state report procedure (S1850) in order to report the power-on state of the SBS 620 to the MBS 630.

In the step S1850, the MT 622 may transmit a base station power state report message indicating the power-on state of the SBS 620 to the MBS 630, and the MBS 630 may receive a base station power state report message, which indicates the power-on state of the SBS 620, from the MT 622 (S1851). The MBS 630 may update the power state from off to on in the SBS 620 context information, based on the received base station power state report message (S1852). In the SBS 620 context information, the power state is updated from off to on, and the MBS 630 may then transmit the base station power state report confirmation message to the MT 622. The MT 622, which receives the base station power state report confirmation message of the MBS 630, may transition to the RRC_INACTIVE state (S1853). After transmitting the base station power state report confirmation message to the MT 622, the MBS 630 may initiate the handover procedure so that at least one terminal, which is connected to the MBS 630 in the coverage of the SBS 620, may be handed over to the BS 621.

In a step S1860, the terminal 610 may perform the handover procedure to be handed from the MBS 630 over to the BS 621. The handover procedure may be initiated by the MBS 630, and may also be initiated by the terminal 610, based on measured channel state information (e.g., reference signal received power (RSRP), received signal strength indicator (RSSI), reference signal received quality (RSRQ), etc.).

In a step S1870, the terminal 610 may transmit and receive data to and from the CN 640 through the BS 621 which has been handed over.

In the step S1800 and the step S1850, the Inactive state may mean the RRC_INACTIVE state, and the connection between the MT and the MBS may be an RRC connection.

If the SBS 620 is in a power-off state, the MBS 630 may transmit only the paging message, which indicates the power-on of the SBS 620, to the MT 622, and the MT 622 may receive only the paging message, which indicates the power-on of the SBS 620, from the MBS 622.

According to the SBS registration procedure and location information update procedure described above, the MBS may store the identifier (ID), location information and power state, etc. for each of the plurality of SBSs, in the SBS context information, and manage the stored information. One exemplary embodiment of the SBS context information managed by MBS may include parameters as shown in Table 4.

TABLE 4

| SBS ID | Location information (Beam index, TA measurement value) | Power State |
|---|---|---|
| 1 | (bi1, ta1) | ON |
| 2 | (bi2, ta2) | OFF |
| 3 | (bi3, ta3) | ON |

Referring to Table 4, the MBS may manage a plurality of SBSs. In order to identify each of the plurality of SBS, the unique ID (e.g., SBS ID) may be allocated according to a predefined method. The location information of each of the plurality of SBSs may include a beam index and a TA measurement value, based on the method shown in FIG. 10. The power state of each of the plurality of SBSs may indicate the power-on state of the BS, which performs the function of a base station, or the power-off state of the BS.

In another exemplary embodiment of the SBS context information managed by the MBS, SBS location information parameters may include latitude and longitude. The SBS location information parameter may be determined during the cell design step or provided from the MT, which performs the terminal function in the SBS, through the SBS registration procedure and SBS location update procedure.

Based on the method of reducing the power consumption of the base station described above, the present disclosure proposes the following.

Suggestion 1: SBS's Off/On Control Under a Heterogeneous Network Environment

The present disclosure proposes a method of reducing network energy using power off/on control of a small cell base station in a heterogeneous network environment in which a macro cell base station and a small cell base station are overlapped.

Suggestion 2: Method of Turning On/Off Small Cell Base Station Using Terminal Function (MT)

The present disclosure proposes adding a device (MT), which performs the terminal function, to a device (BS) which performs the existing base station function, as a method of turning on/off the SBS.

In a heterogeneous network environment, the SBS may perform an operation of blocking power or to turn on the blocked power again depending on the situation. According to the present disclosure, communication may be reduced through a backhaul link between an SBS and an MBS by using a wireless interface between the SBS and the MBS (e.g., NR Uu).

Suggestion 3: Zone-based Location Information

The present disclosure proposes a scheme to divide the coverage of the MBS into a plurality of zones and to obtain location information of the terminal using the beam index and the TA measurement value obtained from the initial connection of the terminal.

Suggestion 4: SBS's Power off Condition

The present disclosure proposes a case where the terminal activation level (UE activity) for the terminals connected to the SBS is equal to or smaller than a threshold as a condition for turning off the SBS (power off condition of the SBS). The UE activity is the total data transmission rate generated by the terminals connected to the SBS and is defined as the above Equation 1.

Suggestion 5: RRC Resumption Cause Indicating Power On/Off of Base Station

The present disclosure proposes adding a field (BsPowerOnInd) indicating that the power of the base station has been turned on, and a field (BsPowerOffInd) indicating the power of the base station has been turned off, to the resumption cause (e.g., ResumeCause) in the RRC resumption request (e.g., RRCResumeRequest and RRCResumeRequest1).

The above-described power state report procedure (S1650 and S1850) may be performed in the RRC_INACTIVE state of the MT 622. Thus, the power state report procedure (S1650 and S1850) may use the existing RRC resumption procedure. In the existing RRC resumption procedure, the RRC resumption request (e.g., RRCResumeRequest and RRCResumeRequest1) message includes an IE (e.g., ResumeCause) indicating the reason why the RRC resumption procedure is performed.

In the present disclosure, the base station power state report message may be a RRC resumption request (e.g., RRCResumeRequest and RRCResumeRequest1) message including the modified resumption cause IE (e.g., ResumeCause), or a newly defined message.

Table 5 shows an exemplary embodiment of the modified resumption cause IE (e.g., RRCResumeCause).

TABLE 5

```
ResumeCause ::=   ENUMERATED {
    emergency, highPriorityAccess, mt-Access, mo-Signalling,
    mo-Data, mo-VoiceCall, mo-VideoCall, mo-SMS, rna-Update,
    mps-Priority Access, mcs-PriorityAccess,
    bs-powerOnInd, bs-powerOffInd,
    spare1, spare2, spare3 }
```

Referring to Table 5, the modified resumption cause IE (e.g., RRCResumeCause) may include a field (e.g., bs-powerOnInd) indicating the power-on of the base station, and a field indicating the power-off of the base station (e.g., bs-powerOffInd) as the cause of performing the RRC resumption procedure.

In the SBS power off procedure described earlier, the MT may transmit the base station power state report message, which reports the power-off of the MT, to the MBT. Here, the base station power state report message may be the RRC resumption request (e.g., RRCResumeRequest and RRCResumeRequest1) message in which the resumption cause (e.g., resumeCause) is the base station power off indication (e.g., bs-powerOffInd).

Further, in the SBS power on procedure described earlier, the MT may transmit the base station power state report message, which reports the power-on of the MT, to the MBT. Here, the base station power state report message may be the RRC resumption request (e.g., RRCResumeRequest and RRCResumeRequest1) message in which the resumption cause (e.g., resumeCause) is the base station power on indication (bs-powerOnInd).

Suggestion 6: RRC Establishment Cause Indicating Power-on of Base Station

In an exemplary embodiment for identifying a general terminal and an MT, the present disclosure proposes adding a field (BsPowerOnInd), which indicates that the power of a base station has been turned on, to the establishment cause (e.g., EstablishmentCause) in the RRC setup request (e.g., RRCSetupRequest) message.

In the present disclosure, the RRC setup request message may be a RRC setup request (e.g., RRCSetupRequest) message including the modified establishment cause IE (e.g., EstablishmentCause), or a newly defined message. The indication of the power-on of the base station may be shown as in Table 6.

TABLE 6

```
EstablishmentCause ::=   ENUMERATED {
        emergency, highPriorityAccess, mt-Access,
        mo-Signalling, mo-Data, mo-VoiceCall,
        mo-VideoCall, mo-SMS, mps-PriorityAccess,
        bs-powerOnInd, spare5, spare4, spare3, spare2, spare 1}
```

Referring to Table 6, the RRC establishment cause IE (e.g., EstablishmentCause) may include a field (e.g., bs-powerOnInd), which indicates the power-on of the base station, as the cause of performing the RRC establishment procedure.

In another exemplary embodiment for identifying a general terminal and an MT, the present disclosure may use information on whether an initial NAS message IE (e.g., dedicatedNAS-Message IE) is included in the RRC setup complete (e.g., RRCSetupComplete) message.

Suggestion 7: Non-application of Access Control in MT

The present disclosure proposes not to apply the access control technique to the MT.

In the case of a general terminal, the terminal may prohibit or restrict an attempt to request the access of the terminal for mobile originating (MO) data or MO signaling by performing access control in the RRC layer.

On the other hand, the MT may not include a NAS layer in the user plane and the control plane. Thus, access control technique may not be applied to the MT.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a first base station including a mobile terminal (MT) and a base station unit (BSU), the method comprising:

determining, by the MT of the first base station, whether there is a terminal connected to the BSU of the first base station, when a power-off condition is satisfied in the BSU;

instructing, by the MT, the terminal, which is connected to the BSU, to be handed over to a second base station, when there is a terminal connected to the BSU;

instructing, by the MT, the BSU to power off the BSU, when the handover of the terminal, which is connected to the BSU, is completed; and transmitting, by the MT, a first message, which indicates a power-off state of the first base station, to the second base station, when the BSU is powered off, wherein a full coverage of the first base station partly overlaps with a coverage of the second base station, and wherein the BSU uses a first frequency, and the second base station uses a second frequency.

2. The method of claim 1, wherein messages delivered between the MT and the second base station are delivered through a control link using the second frequency resource, a connection of the control link to a core network is blocked, and the control link is connected to the second base station.

3. The method of claim 2, wherein the control link is established by an access stratum (AS) layer.

4. The method of claim 2, further comprising temporarily suspending, by the MT, the connection of the control link, based on a second message indicating a base station power state report confirmation received from the second base station.

5. The method of claim 1, wherein a RRC connection of the MT with the second base station is in RRC_INACTIVE state.

6. The method of claim 1, wherein the power off condition is satisfied when a sum of data transmission rates of terminals connected to the BSU is equal to or smaller than a threshold.

7. The method of claim 1, further comprising instructing, by the MT, the BS to immediately power off the BSU, when the power off condition is satisfied, and there is no terminal connected to the BS.

8. The method of claim 1, further comprising:

receiving discontinuous reception (DRX) setting information and paging setting information from the second base station;

monitoring, by the MT, a paging initiated from the second base station, based on the received DRX setting information and paging setting information; and performing, by the MT, a base station power on procedure of turning on a power of the BSU, when a paging message is received from the second base station.

9. A method of a first base station, the method comprising:

determining whether there is a second base station in a power-off state, which belongs to a first area in a cell coverage of the first base station which is set by a plurality of areas, when a user equipment (UE) activity in the first area exceeds a threshold;

transmitting a first message, which indicates a power-on of the second base station, to the second base station, when there is the second base station;

receiving a second message, which indicates that the second base station is in a power-on state, from the second base station; and initiating a handover procedure to allow a terminal, which is located in the first area and is connected to the first base station, to be handed over to the second base station, wherein the first base station uses a first frequency, and the second base station uses a second frequency, and wherein the second base station includes a mobile terminal (MT) and a base station unit (BSU), the first message is a paging message transmitted to the MT of the second base station, and the MT controls the BSU of the second base station to power on the BSU based on the first message.

10. The method of claim 9, wherein messages delivered between the first base station and the second base station are delivered through a control link using the first frequency resource, a connection of the control link to a core network is blocked, and the control link is connected to the second base station.

11. The method of claim 10, wherein the control link is established by an access stratum (AS) layer.

12. The method of claim 10, wherein the receiving of the second message further includes transmitting a third message, which indicates temporary suspension of the connection of the control link, to the second base station.

13. The method of claim 9, wherein the UE activity is a sum of data transmission rates of terminals which are located in the first area and are connected to the base station.

14. A first base station comprising a processor, wherein the processor causes the first base station to:

determine whether there is a second base station in a power-off state, which belongs to a first area in a cell coverage of the first base station which is set by a plurality of areas, when a user equipment (UE) activity in the first area exceeds a threshold;

transmit a first message, which indicates a power-on of the second base station, to the second base station, when there is the second base station;

receive a second message, which indicates that the second base station is in a power-on state, from the second base station; and initiate a handover procedure to allow a terminal, which is located in the first area and is connected to the first base station, to be handed over to the second base station, wherein the first base station uses a first frequency, and the second base station uses a second frequency, and wherein the second base station includes a mobile terminal (MT) and a base station unit (BSU), the first message is a paging message transmitted to the MT of the second base station, and the MT controls the BSU of the second base station to power on the BSU based on the first message.

15. The first base station of claim 14, wherein messages delivered between the first base station and the second base station are delivered through a control link using the first frequency resource, a connection of the control link to a core network is blocked, and the control link is connected to the second base station.

16. The first base station of claim 15, wherein the control link is established by an access stratum (AS) layer.

17. The first base station of claim 15, wherein the receiving of the second message further causes the first base station to transmit a third message, which indicates temporary suspension of the connection of the control link, to the second base station.

18. The first base station of claim 14, wherein the UE activity is a sum of data transmission rates of terminals which are located in the first area and are connected to the base station.

* * * * *